(12) United States Patent
Suzuki et al.

(10) Patent No.: US 12,013,247 B2
(45) Date of Patent: Jun. 18, 2024

(54) INFORMATION PROCESSING APPARATUS AND INFORMATION PROCESSING METHOD

(71) Applicant: SONY CORPORATION, Tokyo (JP)

(72) Inventors: Kento Suzuki, Tokyo (JP); Tetsuo Umeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 452 days.

(21) Appl. No.: 17/250,383

(22) PCT Filed: Jul. 17, 2019

(86) PCT No.: PCT/JP2019/028172
§ 371 (c)(1),
(2) Date: Jan. 14, 2021

(87) PCT Pub. No.: WO2020/022165
PCT Pub. Date: Jan. 30, 2020

(65) Prior Publication Data
US 2021/0293556 A1    Sep. 23, 2021

(30) Foreign Application Priority Data

Jul. 24, 2018  (JP) .................................. 2018-138679

(51) Int. Cl.
  *G01C 21/34*   (2006.01)
  *G01C 21/36*   (2006.01)
(52) U.S. Cl.
  CPC ..... *G01C 21/3438* (2013.01); *G01C 21/3461* (2013.01); *G01C 21/3492* (2013.01); *G01C 21/3611* (2013.01)
(58) Field of Classification Search
  CPC ............ G01C 21/3438; G01C 21/3461; G01C 21/3492; G01C 21/3611; G01C 21/3407;
  (Continued)

(56) References Cited

U.S. PATENT DOCUMENTS 6,317,720 B1 * 11/2001 Murakami ............. G06Q 10/02
  705/13
6,453,298 B2 * 9/2002 Murakami ......... G06Q 30/0202
  705/13
(Continued)

FOREIGN PATENT DOCUMENTS

CN    102982059 A    3/2013
JP    H09153098 A    6/1997
(Continued)

OTHER PUBLICATIONS

International Search Report and Written Opinion of PCT Application No. PCT/JP2019/028172, dated Oct. 8, 2019, 10 pages of ISRWO.

*Primary Examiner* — Jaime Figueroa
(74) *Attorney, Agent, or Firm* — CHIP LAW GROUP

(57) ABSTRACT

There is provided a system for more efficiently transporting transport objects using a moving object. An information processing apparatus (100) that generates a movement instruction for a moving object that carries a transport object includes a first acquisition unit (141) configured to acquire information about the transport object for each space, a second acquisition unit (135) configured to acquire information representing a tendency of whether the moving object moves in accordance with the movement instruction, and a generation unit (143) configured to generate the movement instruction for the moving object on the basis of the information about the transport object and the information representing the tendency.

18 Claims, 14 Drawing Sheets

(58) Field of Classification Search
CPC ... G08G 1/202; G06Q 10/06315; G06Q 50/30
USPC .......................................................... 701/533
See application file for complete search history.

(56) References Cited

U.S. PATENT DOCUMENTS

| | | | | |
|---|---|---|---|---|
| 8,433,461 | B2* | 4/2013 | Daum | B61L 27/12 701/19 |
| 9,424,515 | B2* | 8/2016 | Atlas | G06Q 50/30 |
| 10,402,755 | B2* | 9/2019 | Tomiyama | G06Q 50/30 |
| 10,845,201 | B2* | 11/2020 | Sakata | G06Q 10/047 |
| 11,089,440 | B1* | 8/2021 | Sawahashi | H04L 67/52 |
| 11,441,910 | B2* | 9/2022 | Sakata | G05D 1/0088 |
| 11,619,951 | B2* | 4/2023 | Alonso-Mora | G06Q 10/06311 701/26 |
| 2002/0019760 | A1* | 2/2002 | Murakami | G06Q 10/08 705/7.25 |
| 2011/0071955 | A1* | 3/2011 | Nakamura | G06Q 10/08355 705/338 |
| 2012/0265580 | A1* | 10/2012 | Kobayashi | G06Q 50/30 705/7.31 |
| 2012/0317064 | A1 | 12/2012 | Hagiwara et al. | |
| 2013/0144831 | A1* | 6/2013 | Atlas | G06Q 10/04 706/50 |
| 2015/0105935 | A1* | 4/2015 | Park | G06Q 50/30 701/1 |
| 2016/0117610 | A1* | 4/2016 | Ikeda | G06Q 10/02 705/5 |
| 2016/0209220 | A1* | 7/2016 | Laetz | G06Q 10/047 |
| 2017/0109673 | A1* | 4/2017 | Bell | G06Q 50/28 |
| 2018/0060988 | A1* | 3/2018 | Klenk | G06Q 10/06311 |
| 2018/0150774 | A1* | 5/2018 | Tomiyama | G08G 1/096844 |
| 2018/0211124 | A1* | 7/2018 | Rakah | G06Q 10/047 |
| 2018/0211541 | A1* | 7/2018 | Rakah | G08G 1/148 |
| 2018/0216947 | A1* | 8/2018 | Sakata | G08G 1/127 |
| 2018/0224866 | A1* | 8/2018 | Alonso-Mora | G05D 1/0291 |
| 2018/0341918 | A1* | 11/2018 | Raut | G08G 1/202 |
| 2018/0349850 | A1* | 12/2018 | Hosoda | G06Q 10/08355 |
| 2019/0212149 | A1* | 7/2019 | Ho | G01C 21/3453 |
| 2020/0333146 | A1* | 10/2020 | Shoval | G01C 21/3423 |
| 2020/0334987 | A1* | 10/2020 | Shoval | G01C 21/3492 |
| 2021/0033408 | A1* | 2/2021 | Sakata | G05D 1/0088 |

FOREIGN PATENT DOCUMENTS

| | | | |
|---|---|---|---|
| JP | 2003-091796 A | | 3/2003 |
| JP | 2003091796 A | * | 3/2003 |
| JP | 2006-011726 A | | 1/2006 |
| JP | 2007-129302 A | | 5/2007 |
| JP | 2011-123844 A | | 6/2011 |
| JP | 2013-003643 A | | 1/2013 |
| JP | 2014130552 A | | 7/2014 |
| JP | 2017-138749 A | | 8/2017 |
| JP | 2017138749 A | * | 8/2017 |
| WO | WO-2020022165 A | | 1/2020 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/028172 filed on Jul. 17, 2019, which claims priority benefit of Japanese Patent Application No. JP 2018-138679 filed in the Japan Patent Office on Jul. 24, 2018. Each of the above-referenced applications is hereby incorporated herein by reference in its entirety.

TECHNICAL FIELD

The present disclosure relates to an information processing apparatus, an information processing method, and a program.

BACKGROUND ART

Recently, many technologies related to moving objects, such as drones and autonomous driving technologies, have been developed. One is a technology for efficiently transporting transport objects using a moving object.

For example, PTL 1 below discloses a technology of an allocation system which predicts demand for taxis for individual areas and instructs a taxi close to an area in which occurrence of demand is predicted to be preferentially allocated to the area.

CITATION LIST

Patent Literature

[PTL 1]
JP 2007-129302 A

SUMMARY

Technical Problem

However, in the technology disclosed in above-described PTL 1, it is assumed that drivers (i.e., staff) follow instructions of the allocation system, and presence of drivers who do not follow the instructions is not assumed. Accordingly, drivers who do not follow the instructions of the allocation system may perform actions that are not predicted by the allocation system and steal requests from drivers who follow the instructions of the allocation system, and thus there is concern of the entire allocation plan becoming inefficient.

Accordingly, the present disclosure provides a system for more efficiently transporting transport objects using a moving object.

Solution to Problem

According to the present disclosure, there is provided an information processing apparatus that generates a movement instruction for a moving object that carries a transport object, including: a first acquisition unit configured to acquire information about the transport object for each space; a second acquisition unit configured to acquire information representing a tendency of whether the moving object moves in accordance with the movement instruction; and a generation unit configured to generate the movement instruction for the moving object on the basis of the information about the transport object and the information representing the tendency.

Furthermore, according to the present disclosure, there is provided an information processing method for generating a movement instruction for a moving object that carries a transport object, the information processing method, executed by a processor, including: acquiring information about the transport object for each space; acquiring information representing a tendency of whether the moving object moves in accordance with the movement instruction; and generating the movement instruction for the moving object on the basis of the information about the transport object and the information representing the tendency.

Furthermore, according to the present disclosure, there is provided a program for causing a computer that controls an information processing apparatus that generates a movement instruction for a moving object that carries a transport object to serve as: a first acquisition unit configured to acquire information about the transport object for each space; a second acquisition unit configured to acquire information representing a tendency of whether the moving object moves in accordance with the movement instruction; and a generation unit configured to generate the movement instruction for the moving object on the basis of the information about the transport object and the information representing the tendency.

Advantageous Effects of Invention

As described above, according to the present disclosure, a system for more efficiently transporting transport objects using a moving object is provided. The aforementioned effects are not necessarily limitative and any effect described in this specification or other effects that may be ascertained from this specification may be obtained in addition to or instead of the aforementioned effects.

DESCRIPTION OF EMBODIMENTS

Hereinafter, suitable embodiments of the present disclosure will be described in detail with reference to the attached drawings. Meanwhile, components having substantially the same functional configuration are denoted by the same signs and redundant description thereof is omitted in this specification and drawings.

Further, it is assumed that description will be performed in the following order.
1. Introduction
1.1 Overall configuration
1.2 Technical problems
2. Overview of proposed technology
3. Functional configuration example
4. Processing flow
5. Hardware configuration example
6. Conclusion

1. INTRODUCTION

1.1. Overall Configuration

Figure 1:
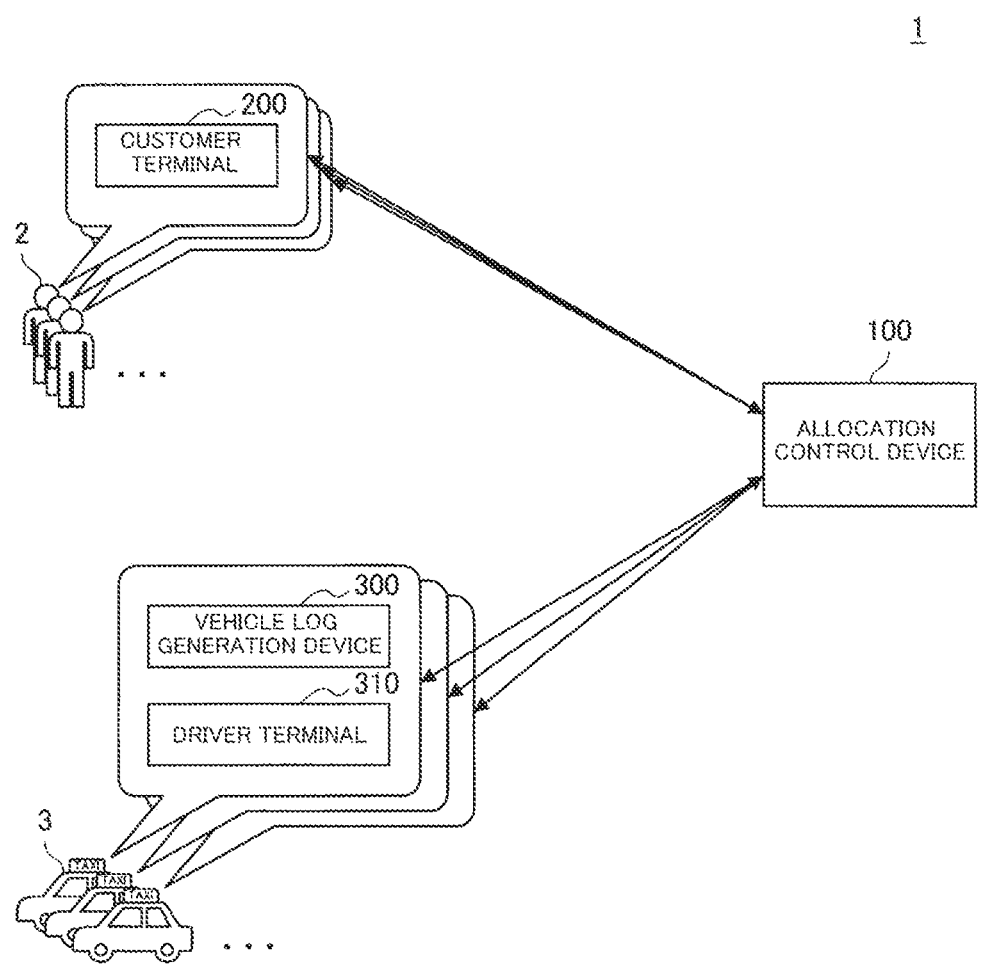
FIG. 1 is a diagram illustrating an example of an overall configuration of an allocation system according to an embodiment of the present disclosure.

FIG. 1 is a diagram illustrating an example of an overall configuration of an allocation system according to an embodiment of the present disclosure. As illustrated in FIG. 1, the allocation system 1 involves an allocation control device 100, transport objects 2, and moving objects 3.

Mobile Objects 3

The moving objects 3 arbitrarily move in the real spaces such as on land, in the sky, over water, under water, or in space. For example, the moving objects 3 may be realized by vehicles such as trucks, buses or taxis, flying vehicles such as planes or drones, ships, submarines, or artificial satellites, or the like. The moving objects 3 can carry arbitrary transport objects. As transport objects, people, animals, freight, or the like may be conceived. In this specification, use cases of allocation will be described on the assumption that the moving objects 3 are taxis and transport objects 2 are customers (people).

As illustrated in FIG. 1, a taxi 3 is associated with a vehicle log generation device 300 and a driver terminal 310. Typically, the taxi 3 is equipped with the vehicle log generation device 300 and the driver terminal 310. It is assumed that a plurality of taxis 3 are present as illustrated in FIG. 1. That is, the allocation system 1 includes a plurality of vehicle log generation devices 300 and a plurality of driver terminals 310.

The vehicle log generation device 300 generates a vehicle log of the taxi 3 equipped with the vehicle log generation device 300 and transmits the vehicle log to the allocation control device 100.

The driver terminal 310 is typically operated by a driver. The driver terminal 310 outputs information received from the allocation control device 100. In addition, the driver terminal 310 transmits information input by the driver to the allocation control device 100.

Customer 2

A customer 2 is an example of a transport object. As illustrated in FIG. 1, the customer 2 is associated with a customer terminal 200. As illustrated in FIG. 1, it is assumed that a plurality of customers 2 are present. That is, the allocation system 1 includes a plurality of customer terminals 200.

The customer terminal 200 is typically operated by the customer 2. The customer terminal 200 outputs information received from the allocation control device 100. In addition, the customer terminal 200 transmits information input by the customer 2 to the allocation control device 100.

Allocation Control Device 100

The allocation control device 100 is an information processing apparatus that performs allocation. This allocation is allocation of a space of a movement destination to the taxi 3 such that the taxi 3 moves to a certain space at a certain time. Specifically, the allocation control device 100 generates a movement instruction for the taxi 3 (or the driver of the taxi 3). Here, the movement instruction is information for instructing the taxi 3 to move and board the customer 2. The movement instruction includes at least information for indicating a space of a movement destination (hereinafter also referred to as an allocation position), which is a position at which the taxi 3 boards the customer 2. This movement instruction is also referred to as an allocation instruction below.

1.2. Technical Problems (1) First Problem

The allocation control device 100 typically predicts a demand amount of the taxi 3 and performs allocation on the basis of the demand amount. However, probability of successful allocation (i.e., probability of succeeding in boarding a customer at an allocation position) is not always high even when an allocation instruction generated on the basis of prediction is followed. That is, boarding of the customer 2 is not guaranteed even when the taxi 3 moves to an allocation position indicated in an allocation instruction. Considering that the wage system of the drivers of the taxis 3 is basically a commission system, it is difficult for the drivers of the taxis 3 to follow allocation instructions that do not guarantee successful allocation. It is conceived that this tendency is particularly strong for experienced veteran drivers. Accordingly, it is desirable to provide a system for reducing a psychological problem of having difficulty following instructions of the allocation system 1.

(2) Second Problem

As described above with respect to the first problem, a psychological problem is present in following instructions of the allocation system 1. Accordingly, there may be drivers who do not follow instructions of the allocation system 1. If drivers who do not follow instructions of the allocation system 1 perform actions that are not predicted by the allocation system 1 and steal requests from drivers who follow instructions of the allocation system 1, there is concern of allocation instruction success probability decreasing and thus the overall allocation plan becoming inefficient. Therefore, it is desirable to provide a system for maintaining high success probability of allocation instruction.

2. OVERVIEW OF PROPOSED TECHNOLOGY (1) First Feature

A first feature of the proposed technology is to allocate an allocation instruction having a high success probability (allocation success index which will be described later) to a taxi 3 having a high rate (allocation system dependence which will be described later) of following instructions of the allocation system 1. Accordingly, a taxi 3 having a high rate of following instructions of the allocation system 1 can efficiently increase sales. Therefore, a psychological problem with respect to following allocation instructions can be reduced and drivers may be encouraged to follow instructions of the allocation system 1. Accordingly, the first problem is solved.

Furthermore, by encouraging drivers to follow instructions of the allocation system 1, proportion of drivers following instructions of the allocation system 1 can be increased. Accordingly, drivers who do not follow instructions of the allocation system 1 stealing requests from drivers who follow instructions of the allocation system 1 can be reduced, and thus high allocation instruction success probability can be maintained. In this manner, the second problem is also solved.

(2) Second Feature

A second feature of the proposed technology pertains to maintaining high allocation instruction success probability.

The allocation system 1 predicts behaviors of taxis 3 that do not follow instructions of the allocation system 1 and performs allocation on the basis of prediction results. For example, the allocation system 1 causes the driver terminal 310 to display a screen through which a movement schedule will be input (allocation information input screen which will be described later) and promotes input of a movement schedule (allocation information which will be described later). In addition, the allocation system 1 predicts a movement schedule on the basis of various types of information with respect to a taxi 3 for which input of a movement schedule has not been acquired. Accordingly, the allocation system 1 can perform allocation by additionally taking behaviors of taxis 3 that do not follow instructions of the allocation system 1 into account. Accordingly, stealing requests can be prevented and thus high allocation instruction success probability can be maintained. In this manner, the second problem is solved.

When the allocation instruction success probability decreases, the allocation system 1 performs re-allocation and re-generates allocation instructions. For example, the allocation system 1 performs re-allocation when the allocation instruction success probability decreases due to stolen requests or the like. Consequently, high allocation instruction success probability can be maintained. In this manner the second problem is solved.

3. FUNCTIONAL CONFIGURATION EXAMPLE

Figure 2:
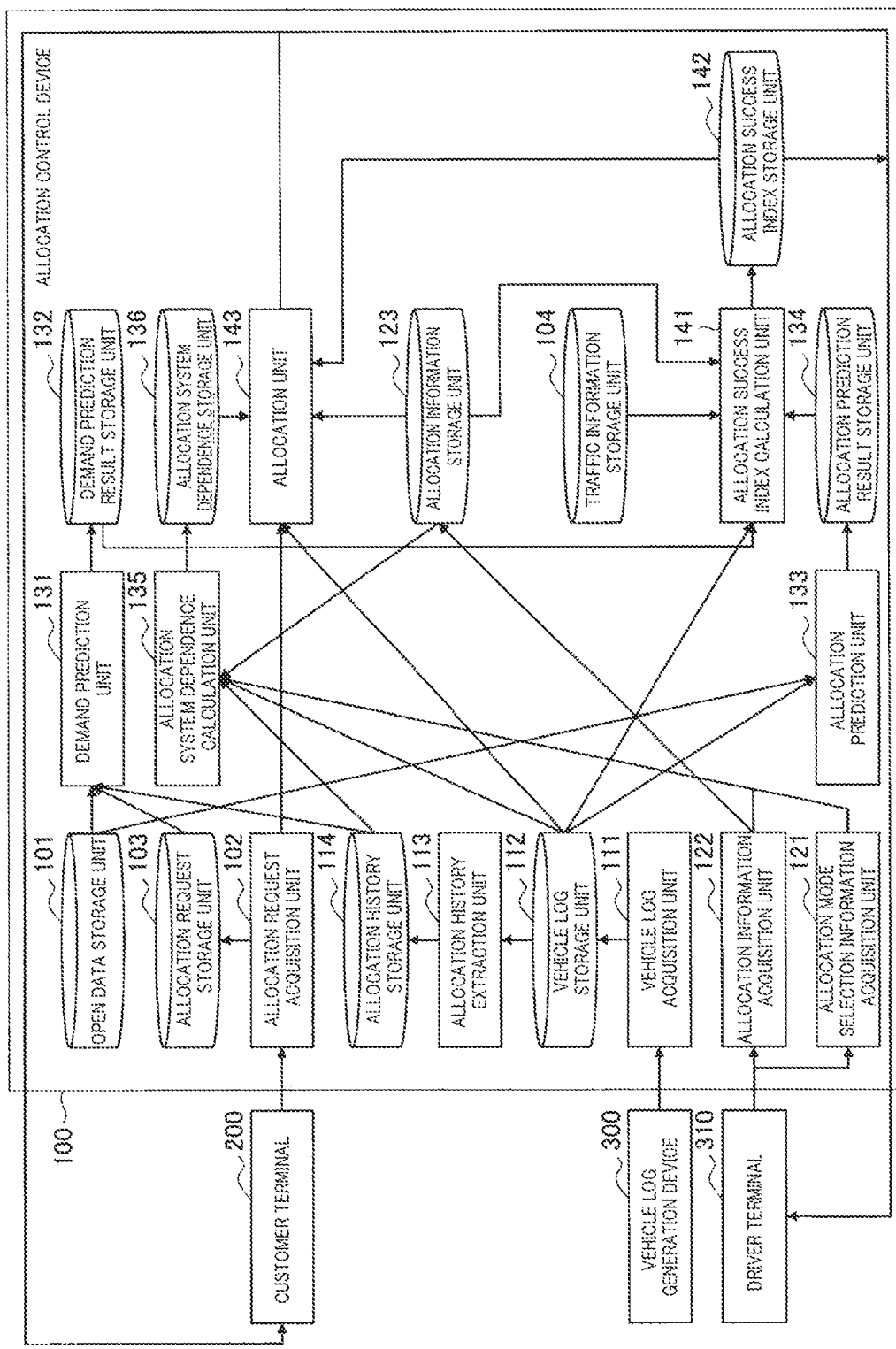
FIG. 2 is a block diagram illustrating an example of a functional configuration of an allocation control device according to the present embodiment.

FIG. 2 is a block diagram illustrating an example of a functional configuration of the allocation control device 100 according to the present embodiment. As illustrated in FIG. 2, the allocation control device 100 includes an open data storage unit 101, an allocation request acquisition unit 102, an allocation request storage unit 103, and a traffic information storage unit 104. In addition, the allocation control device 100 includes a vehicle log acquisition unit 111, a vehicle log storage unit 112, an allocation history extraction unit 113, and an allocation history storage unit 114. Further, the allocation control device 100 includes an allocation mode selection information acquisition unit 121, an allocation information acquisition unit 122, and an allocation information storage unit 123. Further, the allocation control device 100 includes a demand prediction unit 131, a demand prediction result storage unit 132, an allocation prediction unit 133, an allocation prediction result storage unit 134, an allocation system dependence calculation unit 135, and an allocation system dependence storage unit 136. In addition, the allocation control device 100 includes an allocation success index calculation unit 141, an allocation success index storage unit 142, and an allocation unit 143.

(1) Overview of Functional Configuration.

Hereinafter, a relationship between functions of the allocation control device 100 and the functional configuration illustrated in FIG. 2 will be described.

First Acquisition Unit

The allocation control device 100 includes a first acquisition unit that acquires information about a customer 2 for each allocation position candidate. Information about a customer 2 for each allocation position candidate includes information indicating a boarding success probability of a customer 2 for each allocation position candidate. The boarding success probability is a degree indicating the likelihood of a taxi 3 actually being able to board a customer 2 when moved to an allocation position candidate. The boarding success probability is also referred to as an allocation success index below. An allocation success index is acquired by calculation of the allocation success index calculation unit 141 which will be described later. That is, the allocation success index calculation unit 141 corresponds to the first acquisition unit.

An allocation position candidate is a space that can be set as an allocation position. An allocation position candidate may be defined by geographical position information (i.e., position information in the horizontal direction (e.g., latitude information and longitude information)). An allocation position candidate may be one of divided rectangles (hereinafter also referred to as a cells) when the real space is divided in a mesh form in the horizontal directions. An allocation position candidate may be defined by position information in the height direction in addition to geographical position information.

Second Acquisition Unit

The allocation control device 100 includes a second acquisition unit that acquires information representing a tendency of whether a taxi 3 (more specifically, a driver of a taxi 3) moves in accordance with allocation instructions. This information indicating a tendency is also referred to as an allocation system dependence. A taxi 3 having a higher allocation system dependence is likely to move as instructed by the allocation system 1 and a taxi 3 having a lower allocation system dependence is less likely to move as instructed by the allocation system 1. Allocation system dependence may be understood as information associated with a driver of a taxi 3. Allocation system dependence is acquired by calculation of the allocation system dependence calculation unit 135 which will be described later. That is, the allocation system dependence calculation unit 135 corresponds to the second acquisition unit.

Third Acquisition Unit

The allocation control device 100 further includes a third acquisition unit that acquires information indicating a movement schedule of a taxi 3 from the taxi 3 (more accurately, a driver terminal 310 mounted in the taxi 3). A movement schedule of a taxi 3 is an allocation schedule. Information indicating an allocation schedule is also referred to as allocation information below. The allocation information indicates an area corresponding to an allocation position (a space of a movement destination) to which a taxi 3 is scheduled to move and is input by the driver of the taxi 3. The allocation information may be understood as supply prediction having a relatively high likelihood. The allocation information is acquired by the allocation information acquisition unit 122 which will be described later. That is, the allocation information acquisition unit 122 corresponds to the third acquisition unit.

When the third acquisition unit fails to acquire information indicating a movement schedule of a taxi 3 from the taxi 3 (more accurately, a driver terminal 310 mounted in the taxi 3), the third acquisition unit predicts a movement schedule of the taxi 3 and acquires a movement schedule prediction result. Prediction of a movement schedule is also referred to as allocation prediction below, and a movement schedule prediction result is also referred to as an allocation prediction result below. Allocation prediction is prediction of how a driver of a taxi 3 who does not input allocation information will act to perform allocation. An allocation prediction result may be understood as supply prediction having a relatively low likelihood. Allocation prediction is performed by the allocation prediction unit 133 which will be described later. That is, the allocation prediction unit 133 corresponds to the third acquisition unit.

Generation Unit

The allocation control device 100 includes a generation unit that generates allocation instructions on the basis of information acquired by the first acquisition unit, the second acquisition unit, and/or the third acquisition unit. Allocation instructions are generated by the allocation unit 143 which will be described later. That is, allocation unit 143 corresponds to the generation unit.

(2) Details of Each Component

Hereinafter, details of each component illustrated in FIG. 2 will be described.

Open Data Storage Unit 101

The open data storage unit 101 has a function of storing open data. As open data, data used for demand prediction or supply prediction (allocation prediction in this specification), such as weather and train delays, may be conceived. The open data storage unit 101 may search for and output data in response to a search request. The open data storage unit 101 outputs stored open data to the demand prediction unit 131 and the allocation prediction unit 133.

Allocation Request Acquisition Unit 102

The allocation request acquisition unit 102 has a function of acquiring an allocation request from the customer terminal 200. The allocation request acquisition unit 102 outputs an acquired allocation request to the allocation request storage unit 103. An allocation request is information for requesting a taxi 3 to pick up. An example of a format of an allocation request is shown in Table 1 below.

TABLE 1

Table 1. Example of format of allocation request

| Item name | Supplement |
|---|---|
| User ID | Customer identification information |
| Device ID | Customer terminal identification information |

TABLE 1-continued

Table 1. Example of format of allocation request

| Item name | Supplement |
|---|---|
| Desired time of allocation | What time a customer wants to take a taxi |
| Desired position of allocation | Where the customer wants to board a taxi |
| Desired number of persons of allocation | How many customers want to take a taxi |
| Destination | Where the customers wants to exit a taxi |
| Desired time of arrival at destination | What time a customer wants to arrive the destination |
| Presence or absence of large baggage | Whether a trunk is necessary |
| Desire for highway | Highway wired/non-highway road first |
| Allocation request time | The time at which the allocation system receives an allocation request |

Allocation Request Storage Unit 103

The allocation request storage unit 103 has a function of storing past allocation requests. The allocation request storage unit 103 may search for and output data in response to a search request. The allocation request storage unit 103 outputs stored allocation requests to the demand prediction unit 131.

Traffic Information Storage Unit 104

The traffic information storage unit 104 has a function of storing traffic information. The traffic information storage unit 104 may search for and output data in response to a search request. The traffic information storage unit 104 outputs stored traffic information to the allocation success index calculation unit 141. Traffic information is information about occurrence of traffic conditions (e.g., traffic accidents, traffic jams, or the like) different from normal conditions. An example of a format of traffic information is shown in Table 2 below.

TABLE 2

Table 2. Example of format of traffic information

| Item name | Supplement |
|---|---|
| Current time | |
| Start time | Start time of traffic conditions different from normal conditions |
| Estimated duration | Duration of traffic conditions different from normal conditions |
| Target section identification information | Identification information of a target section |
| Estimated time of passing in same direction | Time necessary to pass through a target section in the same direction |
| Estimated time of passing in opposite direction | Time necessary to pass through a target section in the opposite direction |
| Detailed information | Cause of traffic conditions different from normal conditions |

A target section is a section (e.g., a road) that is a target of traffic information. Target section identification information is identification information of a road that is a target section or identification information of cross points of a starting point and an end point of a road that is a target section. Meanwhile, traffic information is used to predict a time of arrival of a taxi 3 at an allocation position. The format of traffic information may vary according to a route search algorithm and a data model.

Vehicle Log Acquisition Unit 111

The vehicle log acquisition unit 111 has a function of acquiring a vehicle log from the vehicle log generation device 300. The vehicle log acquisition unit 111 outputs an acquired vehicle log to the vehicle log storage unit 112. A vehicle log is information indicating an operation condition of a taxi 3. An example of a format of a vehicle log is shown in Table 3 blow.

TABLE 3

Table 3. Example of format of vehicle log

| Item name | Supplement |
| --- | --- |
| Company ID | Taxi company identification information |
| Vehicle ID | Taxi identification information. May be a wireless number set in a taxi. |
| Allocation flag | Flag information indicating whether allocation is possible |
| Current vehicle position | Information for identifying a current position of a taxi Cell ID or latitude information and longitude information |
| Moving direction | Moving direction of a vehicle |
| Velocity | Information about velocity such as average velocity, maximum velocity and minimum velocity |
| Vehicle state | Occupied vehicle (information indicating that vehicle has boarded a customer and is traveling), Vacant vehicle (information indicating that a vehicle is traveling without no customer boarding), Pickup vehicle (state in which a vehicle is traveling to pick up a customer), or the like |
| Staff ID | Driver identification information |
| Time | Time at which a vehicle log is recorded |

Vehicle Log Storage Unit 112

The vehicle log storage unit 112 has a function of storing vehicle logs. The vehicle log storage unit 112 may search for and output data in response to a search request. The vehicle log storage unit 112 outputs stored vehicle logs to the allocation history extraction unit 113, the allocation prediction unit 133, the allocation system dependence calculation unit 135, the allocation success index calculation unit 141, and the allocation unit 143.

Allocation History Extraction Unit 113

The allocation history extraction unit 113 has a function of extracting an allocation history from a vehicle log. An allocation history is a history of a taxi 3 boarding customers 2 and traveling. For example, the allocation history extraction unit 113 may extract an allocation history by recognizing movement of a taxi 3 in an occupied state from a vehicle log in which a vehicle is empty, becomes occupied, and becomes empty again. The allocation history extraction unit 113 outputs an extracted allocation history to the allocation history storage unit 114. An example of a format of an allocation history is shown in Table 4 below.

TABLE 4

Table 4. Example of format of allocation history

| Item name | Supplement |
| --- | --- |
| Company ID | Taxi company identification information |
| Vehicle ID | Taxi identification information. May be a wireless number set in a taxi. |
| Driver ID | Driver identification information |
| Boarding time | Time at which a customer boards |
| Boarding position | Information for identifying a position at which a customer boards. Cell ID or latitude information and longitude information |
| Exit time | Time at which a customer exits |
| Exit position | Information for identifying a position at which a customer exits. Cell ID or latitude information and longitude information |

TABLE 4-continued

Table 4. Example of format of allocation history

| Item name | Supplement |
| --- | --- |
| Related allocation ID | Identification information of allocation information that is an allocation history extraction source |

Allocation History Storage Unit 114

The allocation history storage unit 114 has a function of storing an allocation history. The allocation history storage unit 114 may search for and output data in response to a search request. The allocation history storage unit 114 outputs a stored allocation history to the demand prediction unit 131 and the allocation system dependence calculation unit 135.

Allocation Mode Selection Information Acquisition Unit 121

The allocation mode selection information acquisition unit 121 has a function of acquiring allocation mode selection information from the driver terminal 310. The allocation mode selection information acquisition unit 121 outputs the acquired allocation mode selection information to the allocation system dependence calculation unit 135. Allocation mode selection information is information about selection of an allocation mode by a driver. An allocation mode is an operation mode of the taxi 3. Information provided from the allocation control device 100 to the driver terminal 310 varies according to an allocation mode.

As an allocation mode, for example, a full-auto allocation mode (corresponding to a first mode), a semi-auto allocation mode (corresponding to a second mode), and a manual allocation mode (corresponding to a third mode) may be selected. The full-auto allocation mode is an allocation mode in which the allocation control device 100 provides an allocation instruction and a driver performs driving according to the allocation instruction. The semi-auto allocation mode is an allocation mode in which the allocation control device 100 provides a demand prediction result and an allocation instruction and a driver selects an allocation position on the basis of the provided information. The semi-auto allocation mode differs from the full-auto allocation mode in that a driver can select whether to follow an allocation instruction. In this respect, it can be ascertained that allocation instructions forced to be followed are provided in the full-auto allocation mode and allocation instructions recommended to be followed are provided in the semi-auto allocation mode. The manual allocation mode is an allocation mode in which a driver performs allocation on his/her own. An allocation mode may be selected by a driver through an allocation mode selection screen displayed on the driver terminal 310. An example of the allocation mode selection screen will be described with reference to FIG. 3.

Figure 3:
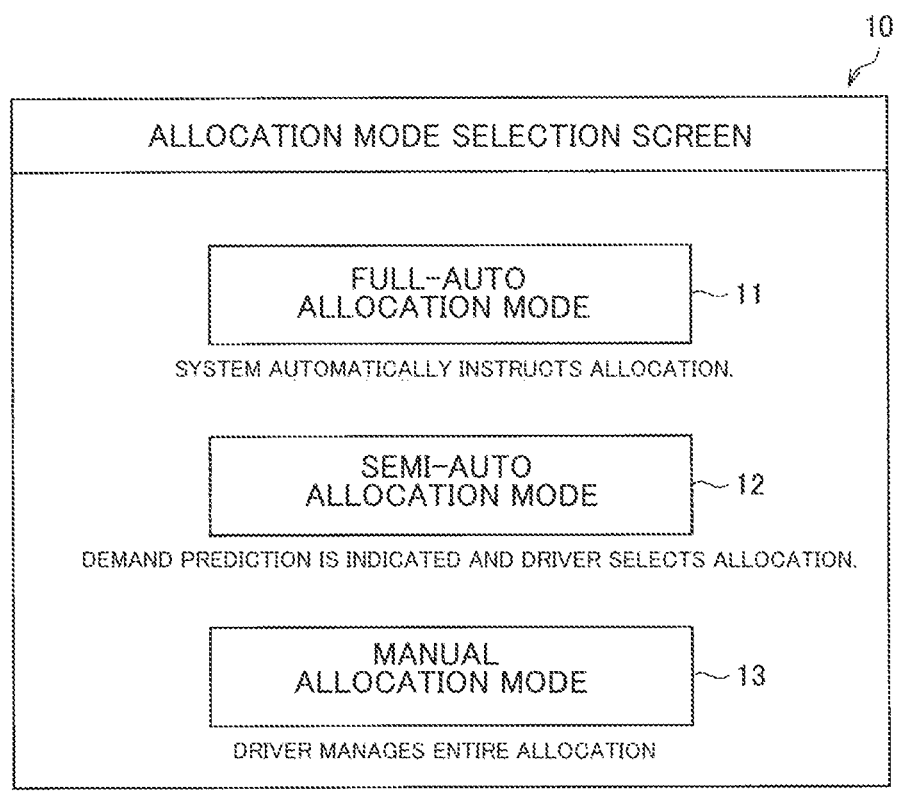
FIG. 3 is a diagram illustrating an example of an allocation mode selection screen according to the present embodiment.

FIG. 3 is a diagram illustrating an example of the allocation mode selection screen according to the present embodiment. The allocation mode selection screen 10 illustrated in FIG. 3 is displayed on the driver terminal 310. As illustrated in FIG. 3, the allocation mode selection screen 10 includes a full-auto allocation mode selection button 11, a semi-auto allocation mode selection button 12, and a manual allocation mode selection button 13. When a driver presses the full-auto allocation mode selection button 11, the driver terminal 310 receives selection of the full-auto allocation mode. When a driver presses the semi-auto allocation mode selection button 12, the driver terminal 310 receives selection of the semi-auto allocation mode. When a driver presses the manual allocation mode selection button 13, the driver terminal 310 receives selection of the manual allocation mode. The driver terminal 310 receives an allocation mode selection operation of a driver, generates allocation mode selection information on the basis of a selection result, and transmits the allocation mode selection information to the allocation control device 100.

An example of a format of the allocation mode selection information is shown in Table 5 below.

TABLE 5

Table 5. Example of format of allocation mode

| Item name | Supplement |
|---|---|
| Selection time | Time at which selection of allocation mode is received |
| Allocation mode | Selected allocation mode (full-auto allocation mode/semi-auto allocation mode/ manual allocation mode, etc.) |

Allocation Information Acquisition Unit 122

The allocation information acquisition unit 122 has a function of acquiring allocation information from the driver terminal 310. The allocation information acquisition unit 122 outputs the acquired allocation information to the allocation information storage unit 123 and the allocation system dependence calculation unit 135. The driver terminal 310 displays an allocation information input screen and receives input of allocation information from the driver. An example of an allocation information input screen for each allocation mode will be described with reference to FIG. 4 to FIG. 6.

Figure 4:
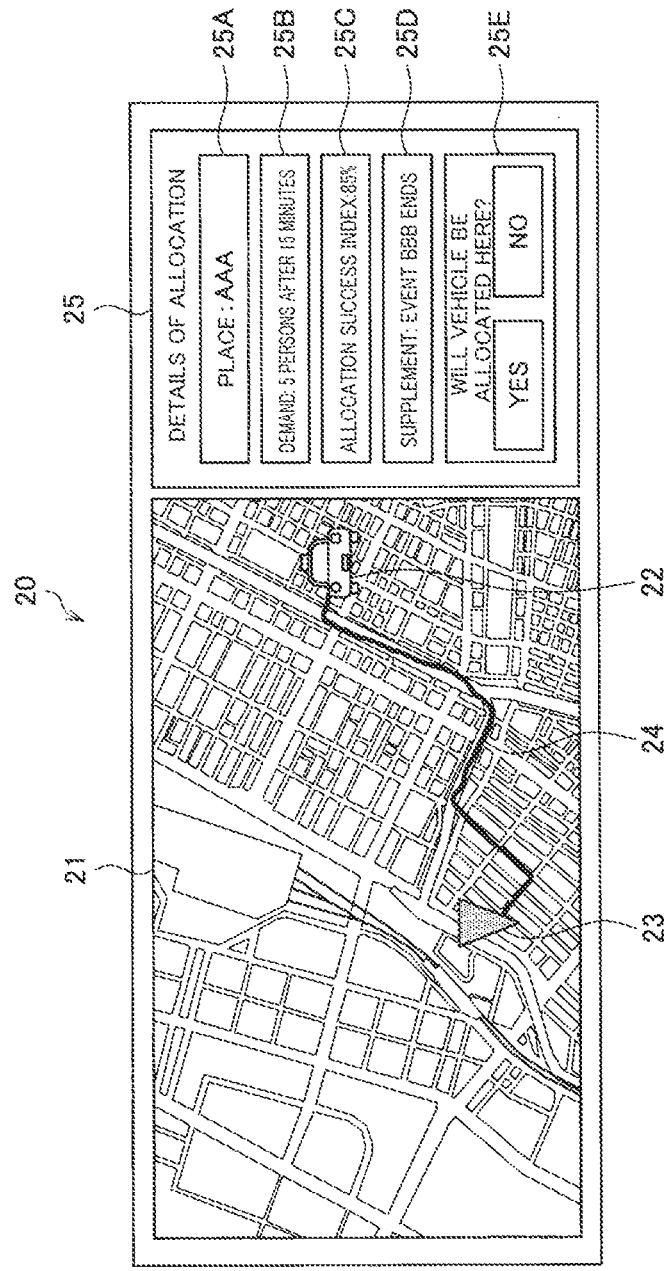
FIG. 4 is a diagram illustrating an example of an allocation information input screen of a full-auto allocation mode according to the present embodiment.

FIG. 4 is a diagram illustrating an example of an allocation information input screen of the full-auto allocation mode according to the present embodiment. The allocation information input screen 20 illustrated in FIG. 4 is displayed on the driver terminal 310 of a taxi 3 for which the full-auto allocation mode is set. The allocation information input screen 20 includes map information 21 and information 25 on details of allocation. Information (icon) 22 indicating a current position of the taxi 3, information (icon) 23 indicating an allocation position instructed through an allocation instruction from the allocation control device 100, and information 24 indicating a moving route to the allocation position are mapped to the map information 21. The information 25 on details of allocation includes information 25A indicating details of an allocation position, information 25B indicating a predicted demand amount, information 25C indicating an allocation success index, supplementary information 25D about the allocation position, and an allocation information input button 25E. Here, with respect to the information 25 on details of allocation in the full-auto allocation mode, information about an allocation position instructed by the allocation control device 100 is displayed. The allocation information acquisition unit 122 acquires information indicating whether the taxi 3 moves according to an allocation instruction on the basis of a result of selection of "YES" or "NO" of the allocation information input button 25E. Specifically, when the driver selects "YES" of the allocation information input button 25E, it is determined that the taxi 3 moves according to the allocation instruction. In this case, the driver terminal 310 transmits allocation information in which a position indicated by the icon 23 is set to an allocation position to the allocation control device 100. When the driver selects "NO" of the allocation information input button 25E, it is determined that the taxi 3 does not move according to the allocation instruction. In this case, the driver terminal 310 transmits allocation information in which a position indicated by the icon 23 is not set to an allocation position to the allocation control device 100.

Figure 5:
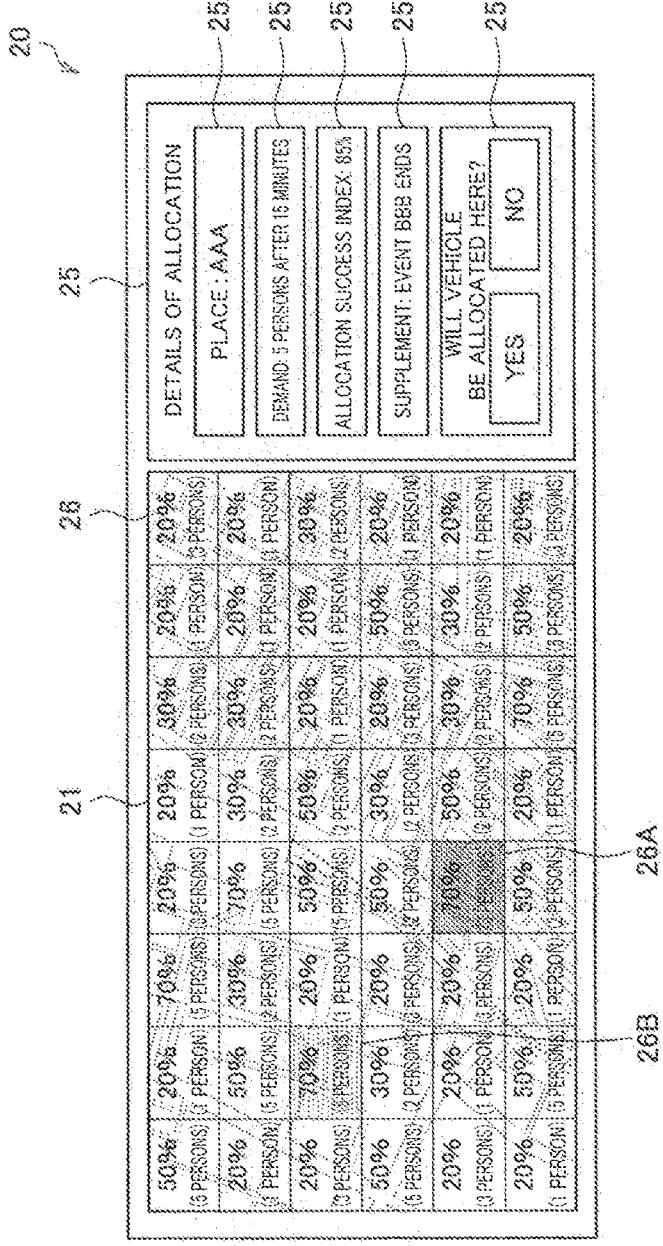
FIG. 5 is a diagram illustrating an example of an allocation information input screen of a semi-auto allocation mode according to the present embodiment.

FIG. 5 is a diagram illustrating an example of an allocation information input screen in the semi-auto allocation mode according to the present embodiment. The allocation information input screen 20 illustrated in FIG. 5 is displayed on the driver terminal 310 of a taxi 3 for which the semi-auto allocation mode is set. The allocation information input screen 20 includes map information 21 and information 25 on details of allocation. Information 26 indicating an allocation success index and a predicted demand amount for each allocation position candidate is mapped to the map information 21. In addition, information indicating an allocation position instructed through an allocation instruction from the allocation control device 100 is mapped to the map information 21. Specifically, in the map information 21 a cell 26A corresponding to an allocation position instructed through an allocation instruction from the allocation control device 100 is displayed in an emphasized manner. The driver can select which cell will be set to an allocation position with reference to such information. A cell 26B selected by the driver is also displayed in the map information 21 in an emphasized manner. The information 25 on details of allocation includes information 25A indicating details of an allocation position, information 25B indicating a predicted demand amount, information 25C indicating an allocation success index, supplementary information 25D about the allocation position, and an allocation information input button 25E. Here, with respect to the information 25 on details of allocation in the semi-auto allocation mode, information about an allocation position selected by the driver is displayed. The allocation information acquisition unit 122 acquires information indicating an allocation position input through the allocation information input screen 20 on the basis of a result of selection of "YES" or "NO" of the allocation information input button 25E. Specifically, when the driver selects "YES" of the allocation information input button 25E, it is determined that the taxi 3 moves according to the allocation instruction. In this case, the driver terminal 310 transmits allocation information in which the cell 26B selected by the driver is set to an allocation position to the allocation control device 100. When the driver selects "NO" of the allocation information input button 25E, it is determined that the taxi 3 does not move according to the allocation instruction. In this case, the driver terminal 310 receives an operation of the driver re-selecting an allocation position.

Figure 6:
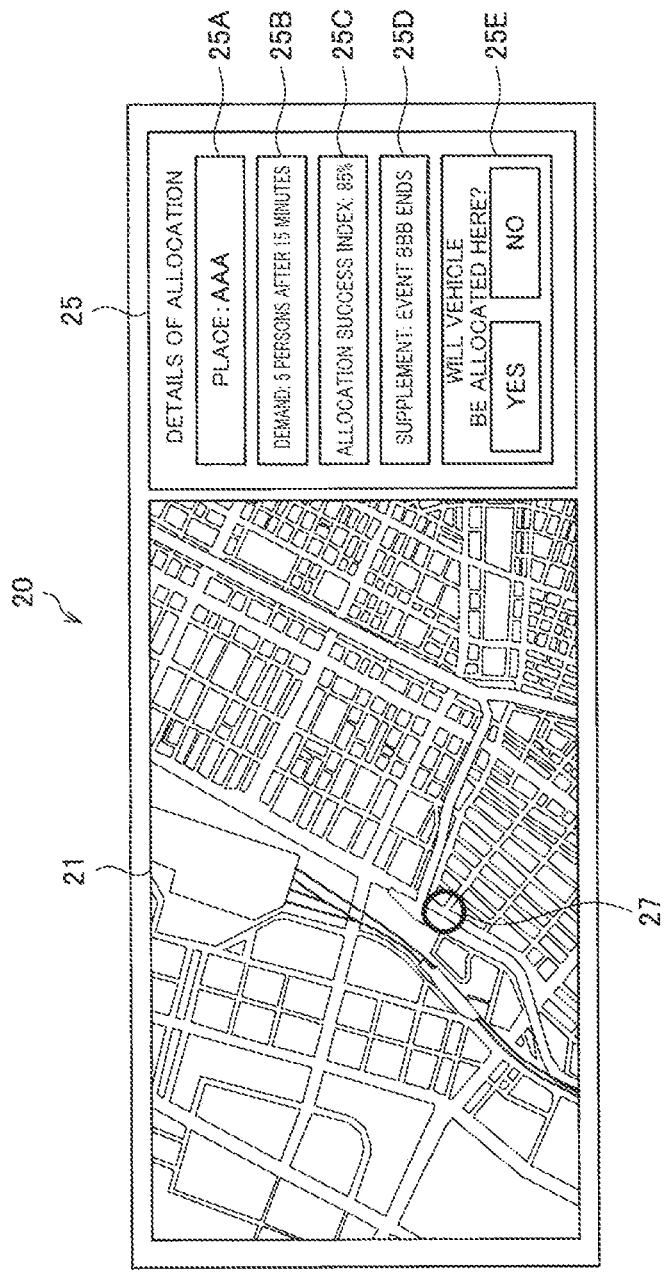
FIG. 6 is a diagram illustrating an example of an allocation information input screen of a manual allocation mode according to the present embodiment.

FIG. 6 is a diagram illustrating an example of an allocation information input screen of the manual allocation mode according to the present embodiment. The allocation information input screen 20 illustrated in FIG. 6 is displayed on the driver terminal 310 of a taxi 3 for which the manual allocation mode is set. The allocation information input screen 20 includes map information 21 and information 25 on details of allocation. The driver can designate an allocation position by selecting an arbitrary position on a map displayed on the map information 21. When the driver selects an allocation position, information (icon) 27 indicating an allocation position selected by a customer 2 is overlaid on the map in the map information 21. The information 25 on details of allocation includes information 25A indicating details of an allocation position, information 25B indicating a predicted demand amount, information 25C indicating an allocation success index, supplementary information 25D about the allocation position, and an allocation information input button 25E. Here, with respect to the information 25 on details of allocation in the manual allocation mode, information about an allocation position selected by the driver is displayed. The allocation information acquisition unit 122 acquires information indicating an allocation position input through the allocation information input screen 20 on the basis of a result of selection of "YES" or "NO" of the allocation information input button 25E. When the driver selects "YES" of the allocation information input button 25E, the driver terminal 310 transmits allocation information in which a position of an icon 27A selected by the driver is set to an allocation position to the allocation control device 100. When the driver selects "NO" of the allocation information input button 25E, the driver terminal 310 receives an operation of re-selecting an allocation position by the driver.

The allocation information acquisition unit 122 can acquire allocation information irrespective of an allocation mode. That is, the allocation information acquisition unit 122 can also acquire allocation information of a driver who does not follow the allocation system 1. Accordingly, since a driver is prevented from performing an action that is not predicted by the allocation system 1, the allocation unit 143 which will be described later may realize more suitable allocation.

An example of a format of allocation information is shown in Table 6 below.

TABLE 6

Table 6. Example of format of allocation information

| Item name | Supplement |
| --- | --- |
| Current time | |
| Current vehicle position | Information for identifying a current position of a taxi. Cell ID or latitude information and longitude information |
| Vehicle ID | Taxi identification information. May be a wireless number set in a taxi. |
| Driver ID | Driver identification information |
| Scheduled allocation time | Scheduled allocation time (scheduled time of arrival at allocation position) |
| Scheduled allocation position | Information for identifying a scheduled allocation position. Cell ID or latitude information and longitude information |
| Recommended allocation position | Information for identifying a recommended allocation position. Cell ID or latitude information and longitude information<br>* Only in the case of the semi-auto allocation mode |
| Change information | Information indicating whether there is new input or update |
| Flag indicating whether a driver has performed manual registration | Flag indicating whether allocation information is input in the manual allocation mode or whether the allocation information is different from allocation instructions in the semi-auto allocation mode |

Allocation Information Storage Unit 123

The allocation information storage unit 123 has a function of storing allocation information. The allocation information storage unit 123 may search for and output data in response to a search request. The allocation information storage unit 123 outputs stored allocation information to the allocation system dependence calculation unit 135, the allocation success index calculation unit 141, and the allocation unit 143.

Demand Prediction Unit 131

The demand prediction unit 131 has a function of predicting demand for a taxi 3. The demand prediction unit 131 predicts demand for taxis 3 on the basis of open data, allocation requests, and allocation histories. For example, the demand prediction unit 131 may learn a prediction model in advance on the basis of past data and input this information to the learned prediction model to predict future demand. The demand prediction unit 131 may predict demand for each allocation position candidate. A demand amount is typically predicted as the number of taxis 3. In addition, a demand amount may be predicted as the number of customers.

Figure 7:
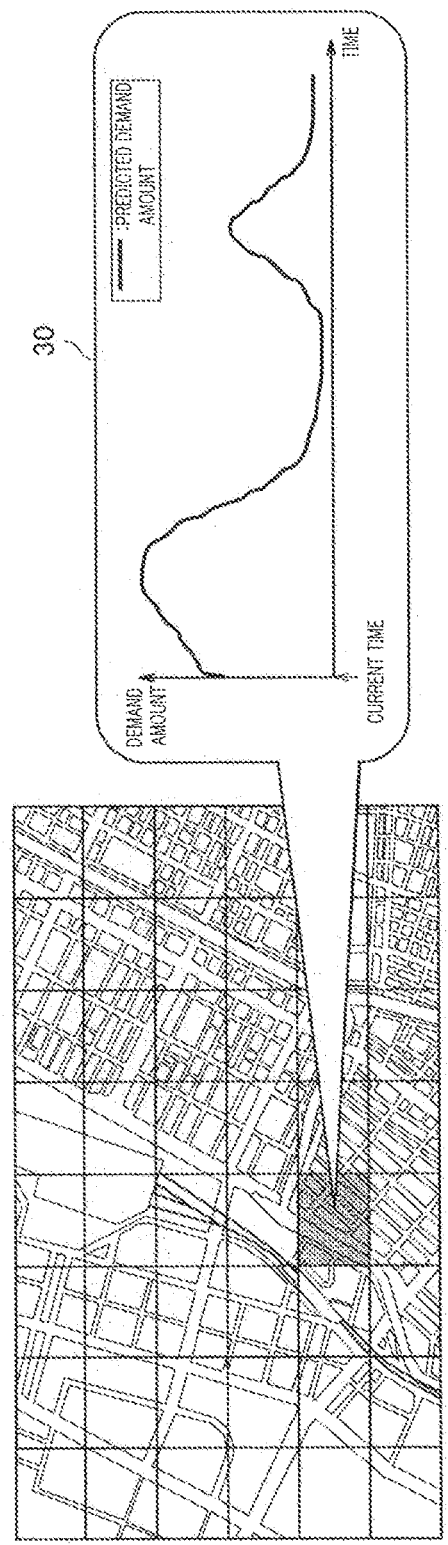
FIG. 7 is a diagram for describing an example of demand prediction according to the present embodiment.

FIG. 7 is a diagram for describing an example of demand prediction according to the present embodiment. In the example illustrated in FIG. 7, the demand prediction unit 131 predicts demand for taxis 3 at each time in the future for each cell. A graph 30 shows time-series variation of a predicted demand amount in a certain cell. The vertical axis of the graph 30 is a demand amount and the horizontal axis is time. The origin of the graph 30 is a current time.

The demand prediction unit 131 outputs a demand prediction result to the demand prediction result storage unit 132. An example of a format of a demand prediction result is shown in Table 7 below.

TABLE 7

Table 7. Example of format of demand prediction result

| Item name | Supplement |
| --- | --- |
| Current time | |
| Position information | Information for identifying a position at which it is predicted to occur demand. Cell ID or latitude information and longitude information |
| Predicted demand amount after 0 to 1 minute | Demand amount predicted to occur after 0 to 1 minute (the number of taxis) |
| Predicted demand amount after 1 to 2 minutes | Demand amount predicted to occur after 1 to 2 minutes (the number of taxis) |
| Predicted demand amount after 29 to 30 minutes | Demand amount predicted to occur after 29 to 30 minutes (the number of taxis) |

Demand Prediction Result Storage Unit 132

The demand prediction result storage unit 132 has a function of storing a demand prediction result. The demand prediction result storage unit 132 may search for and output data in response to a search request. The demand prediction result storage unit 132 outputs stored demand prediction results to the allocation success index calculation unit 141.

Allocation Prediction Unit 133

The allocation prediction unit 133 has a function of predicting allocation information of each taxi 3. The allocation prediction unit 133 predicts allocation information on the basis of open data and a vehicle log. Specifically, the allocation prediction unit 133 models a driving behavior of a driver on the basis of past open data and vehicle logs and predicts a future driving behavior of the driver on the basis of a current vehicle log and open data. Particularly, the allocation prediction unit 133 predicts allocation information for a taxi 3 for which the allocation information acquisition unit 122 has failed to acquire allocation information. The allocation unit 143 which will be described later can even perform allocation on the basis of prediction of behaviors of drivers who even do not input allocation information among drivers who do not follow the allocation system 1. Accordingly, it is possible to realize more suitable allocation.

An example of a format of an allocation prediction result is shown in Table 8 below.

TABLE 8

Table 8. Example of format of allocation prediction result

| Item name | Supplement |
| --- | --- |
| Allocation prediction ID | Allocation prediction identification information |
| Driver ID | Driver identification information |
| Predicted allocation time | Scheduled time of arrival at a predicted allocation position |
| Predicted allocation position | Predicted allocation position (cell ID or the like) |
| Predicted route | Predicted route to a predicted allocation position |
| Predicted likelihood | Likelihood of allocation prediction being correct |

Allocation Prediction Result Storage Unit 134

The allocation prediction result storage unit 134 has a function of storing allocation prediction results. The allocation prediction result storage unit 134 may search for and output data in response to a search request. The allocation prediction result storage unit 134 outputs stored allocation prediction results to the allocation success index calculation unit 141.

Allocation System Dependence Calculation Unit 135

The allocation system dependence calculation unit 135 has a function of calculating allocation system dependence of each driver. The allocation system dependence calculation unit 135 calculates allocation system dependence on the basis of an allocation history, a vehicle log, allocation mode selection information, allocation information, and past allocation information. The allocation system dependence calculation unit 135 generates allocation system dependence information and outputs the allocation system dependence information to the allocation system dependence storage unit 136. The allocation system dependence information includes allocation system dependence and information used to calculate the allocation system dependence. An example of a format of allocation system dependence information is shown in Table 9 below.

TABLE 9

Table 9. Example of format of allocation system dependence information

| Item name | Supplement |
| --- | --- |
| Driver ID | Driver identification information |
| Update time | Final update time |
| Total point | Allocation system dependence. The sum of a basic point and an additional point |
| Basic point | Basic point determined by expression of intention of a driver |
| Additional point | Additional point determined by an actual behavior of a driver |

Hereinafter, an example of a method of calculating allocation system dependence will be described in detail with reference to FIG. 8.

Figure 8:
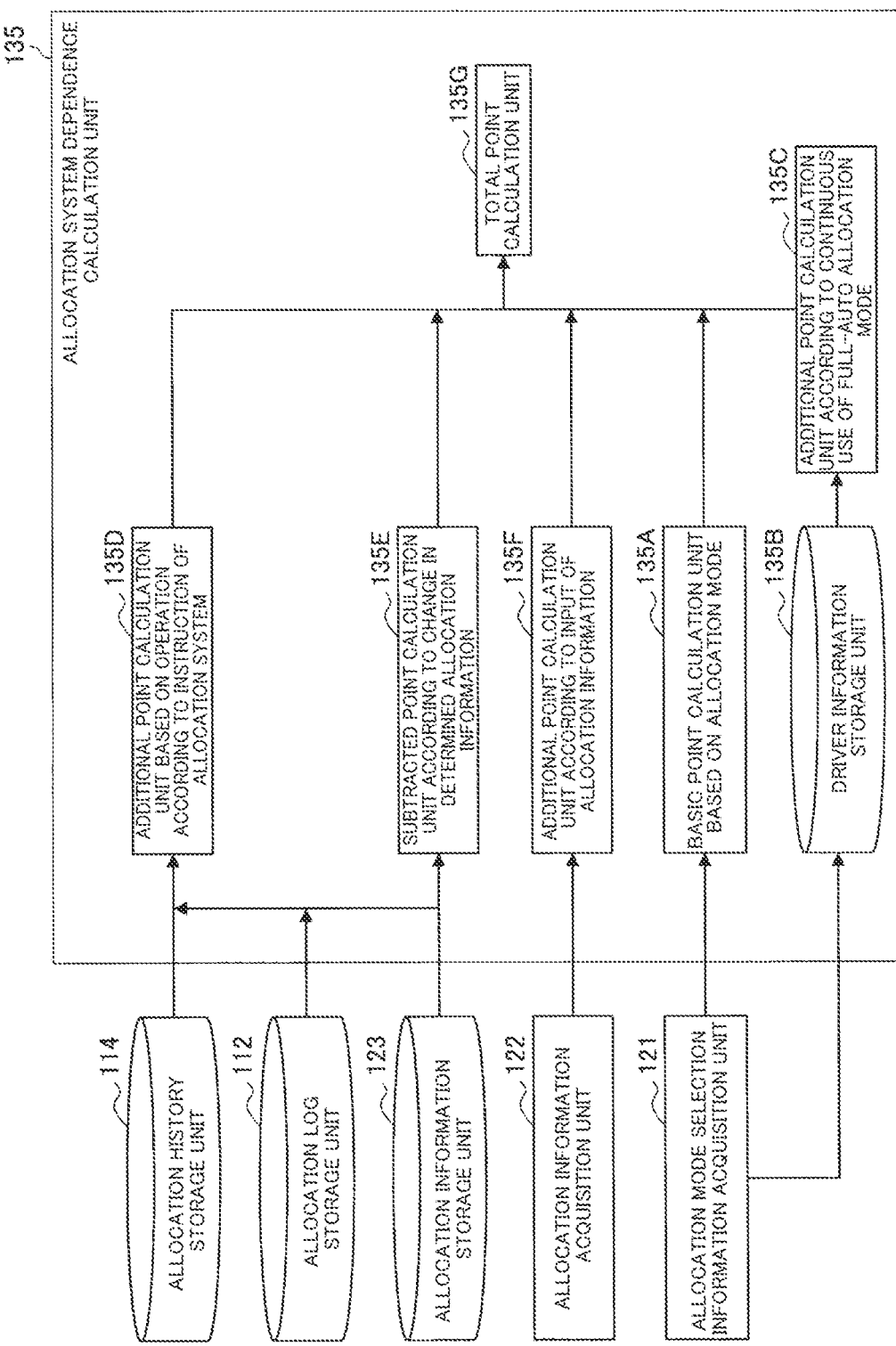
FIG. 8 is a diagram for describing an example of an allocation system dependence calculation method according to the present embodiment.

FIG. 8 is a diagram for describing an example of a method of calculating allocation system dependence according to the present embodiment. As illustrated in FIG. 8, the allocation system dependence calculation unit 135 includes a basic point calculation unit 135A based on an allocation mode, a driver information storage unit 135B, an additional point calculation unit 135C according to continuous use of the full-auto allocation mode, an additional point calculation unit 135D based on an operation according to instructions of the allocation system, a subtracted point calculation unit 135E according to change in determined allocation information, an additional point calculation unit 135F according to input of allocation information, and a total point calculation unit 135G. An example of a structure of internal data input and output between these components is shown in Table 10 below.

TABLE 10

Table 10. Example of internal data structure for calculation of allocation system dependence

| Item name | Supplement |
| --- | --- |
| Current time | |
| Driver ID | Driver identification information |
| Basic point added/subtracted point | Point to/from which a basic point has been added/subtracted |
| Additional point added/substrate point | Point to/from which an additional point has been added/subtracted |
| Description | Description of reason for addition or subtraction |

Allocation system dependence is set in response to an allocation mode. Specifically, the basic point calculation unit 135A based on an allocation mode calculates a basic point of allocation system dependence on the basis of allocation mode selection information output from the allocation mode selection information acquisition unit 121. The basic point calculation unit 135A based on an allocation mode calculates a higher basic point for an allocation mode with a higher degree of following instructions of the allocation system 1. For example, the basic point calculation unit 135A based on an allocation mode may calculate a highest basic point when the allocation mode is the full-auto allocation mode. In addition, the basic point calculation unit 135A based on an allocation mode may calculate a second highest basic point when the allocation mode is the semi-auto allocation mode and calculate a lowest basic point when the allocation mode is the manual allocation mode. The basic point calculation unit 135A based on an allocation mode outputs a calculated basic point to the total point calculation unit 135G. A data structure at the time of output is as shown in Table 10.

The driver information storage unit 135B stores driver information. Driver information stores at least information about allocation mode selection results of drivers. An example of a format of driver information is shown in Table 11 below.

TABLE 11

Table 11. Example of format of driver information

| Item name | Supplement |
| --- | --- |
| Driver ID | ID of a driver |
| Update time | Final update time |
| Selected allocation mode | Selected allocation mode (full-auto allocation mode/semi-auto allocation mode/manual allocation mode, or the like) |

Allocation system dependence is set in response to a duration of the full-auto allocation mode. Specifically, the additional point calculation unit 135C according to continuous use of the full-auto allocation mode calculates an additional point (added point) in response to a duration of the full-auto allocation mode. The additional point calculation unit 135C according to continuous use of the full-auto allocation mode regularly reads driver information from the driver information storage unit 135B and calculates a higher added point for a longer duration of the full-auto allocation mode. The additional point calculation unit 135C according to continuous use of the full-auto allocation mode outputs a calculated additional point to the total point calculation unit 135G. A data structure at the time of output is as shown in Table 10.

Allocation system dependence is set in response to whether movement is performed according to allocation instructions. Specifically, the additional point calculation unit 135D based on an operation according to instructions of the allocation system calculates an additional point (added point) when a driver has driven a taxi 3 according to instructions of the allocation system 1. For example, the additional point calculation unit 135D based on an operation according to instructions of the allocation system may calculate an added point when a taxi 3 in the full-auto allocation mode or the semi-auto allocation mode has moved and boarded a customer 2 according to allocation instructions. In addition, the additional point calculation unit 135D based on an operation according to instructions of the allocation system compares allocation information stored in the allocation information storage unit 123 with an actual operation state of a taxi 3 and calculates a higher added point when a degree indicating the likelihood of the allocation information consistent with the actual operation state is higher. The actual operation state of the taxi 3 is recognized by an allocation history stored in the allocation history storage unit 114. Meanwhile, when a taxi 3 has boarded a customer 2 on a route to an allocation position, the additional point calculation unit 135D based on an operation according to instructions of the allocation system regards the operation of the taxi 3 as operation according to allocation instructions if the taxi 3 does not depart from the route and calculates an added point. Accordingly, the additional point calculation unit 135D based on an operation according to instructions of the allocation system may determine whether the taxi 3 departs from the route on the basis of a vehicle log stored in the vehicle log storage unit 112, for example. The additional point calculation unit 135D based on an operation according to instructions of the allocation system outputs a calculated additional point to the total point calculation unit 135G. A data structure at the time of output is as shown in Table 10.

Allocation system dependence is set in response to whether an allocation position has been changed after it is determined that a taxi 3 follows allocation instructions. Specifically, the subtracted point calculation unit 135E according to change in determined allocation information calculates an additional point (subtracted point) on the basis of time-series variation in allocation information stored in the allocation information storage unit 123 when a driver has changed determined allocation information. The subtracted point calculation unit 135E according to change in determined allocation information calculates a subtracted point when a driver of a taxi 3 has determined allocation information once through the allocation information input screen and then determined different allocation information again. When allocation information has been changed, point subtraction is performed because an allocation success index which will be described later will be re-calculated and other allocations may be affected. The subtracted point calculation unit 135E according to change in determined allocation information outputs a calculated subtracted point to the total point calculation unit 135G. A data structure at the time of output is as shown in Table 10.

Allocation system dependence is set in response to whether an allocation position of a taxi 3 has been presented to the allocation control device 100. Specifically, the additional point calculation unit 135F according to input of allocation information calculates an additional point (added point) for a driver who has input allocation information through the allocation information input screen. For example, the additional point calculation unit 135F according to input of allocation information may calculate an added point when a driver of a taxi 3 in the semi-auto allocation mode or the manual allocation mode has input allocation information through the allocation information input screen. This is because the driver does not perform an action that is not predicted by the allocation system 1 and accuracy of allocation instructions is improved when allocation information is input. In addition, the additional point calculation unit 135F according to input of allocation information calculates an added point when a driver of a taxi 3 in the semi-auto allocation mode has input allocation information according to a recommended allocation instruction from the allocation control device 100 through the allocation information input screen. This is because it is possible to approach optimized allocation as a whole when a recommended allocation instruction is followed. The additional point calculation unit 135F according to input of allocation information outputs a calculated additional point to the total point calculation unit 135G. A data structure at the time of output is as shown in Table 10.

The total point calculation unit 135G calculates a total point of allocation system dependence. The total point calculation unit 135G calculates a total point of allocation system dependence by adding up a basic point calculated by the basic point calculation unit 135A based on an allocation mode, an additional point (added point) calculated by the additional point calculation unit 135C according to continuous use of the full-auto allocation mode, an additional point (added point) calculated by the additional point calculation unit 135D based on an operation according to instructions of the allocation system, a subtracted point calculated by the subtracted point calculation unit 135E according to change in determined allocation information, and an additional point (added point) calculated by the additional point calculation unit 135F according to input of allocation information.

Meanwhile, the allocation control device 100 (e.g., the allocation information acquisition unit 122) may cause the driver terminal 310 to display information representing an action that triggers change of allocation system dependence. For example, the driver terminal 310 may display information representing that a high basic point is assigned if the allocation mode of a taxi 3 is changed to the full-auto allocation mode. In addition, the driver terminal 310 may display information indicating a remaining time until an added point in response to a duration is assigned when the allocation mode of the taxi 3 is the full-auto allocation mode, for example. Accordingly, it is possible to promote a driver to improve allocation system dependence. An example of a screen displayed on the driver terminal 310 is shown in FIG. 9.

Figure 9:
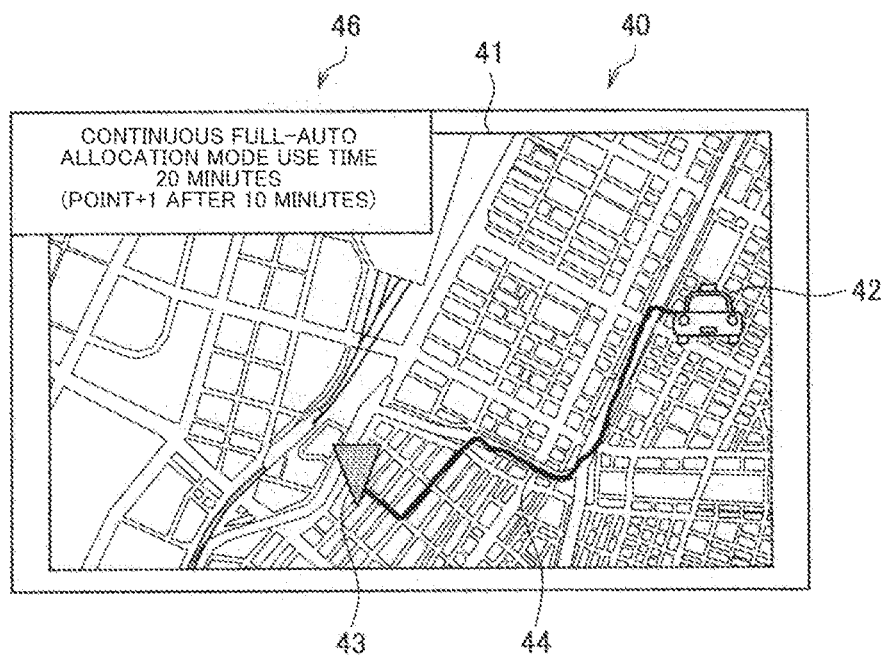
FIG. 9 is a diagram illustrating an example of a navigation screen according to the present embodiment.

FIG. 9 is a diagram illustrating an example of a navigation screen according to the present embodiment. The navigation screen 40 illustrated in FIG. 9 is displayed on the driver terminal 310 of a taxi 3 that is moving to an allocation position. The navigation screen 40 includes map information 41 to which information (icon) 42 indicating a current position of the taxi 3, information (icon) 43 indicating the allocation position, and information 44 indicating a moving route to the allocation position are mapped. Further, the navigation screen 40 includes information 46 representing that a duration of the full-auto allocation mode has reached 20 minutes and 1 point (an added point for calculation of allocation system dependence) will be added after 10 minutes. The driver is motivated to continuously use the full-auto allocation mode according to such information 46. Accordingly, it is possible to promote the driver to improve allocation system dependence.

Allocation System Dependence Storage Unit 136

The allocation system dependence storage unit 136 has a function of storing allocation system dependence. The allocation system dependence storage unit 136 can search for and output data in response to a search request. The allocation system dependence storage unit 136 outputs the stored allocation system dependence to the allocation unit 143.

Allocation Success Index Calculation Unit 141

The allocation success index calculation unit 141 has a function of calculating an allocation success index for each allocation position candidate for each taxi 3. The allocation success index calculation unit 141 calculates an allocation success index on the basis of traffic information, a vehicle log, a demand prediction result, allocation information, and an allocation prediction result. An allocation success index calculation logic is illustrated in FIG. 10.

Figure 10:
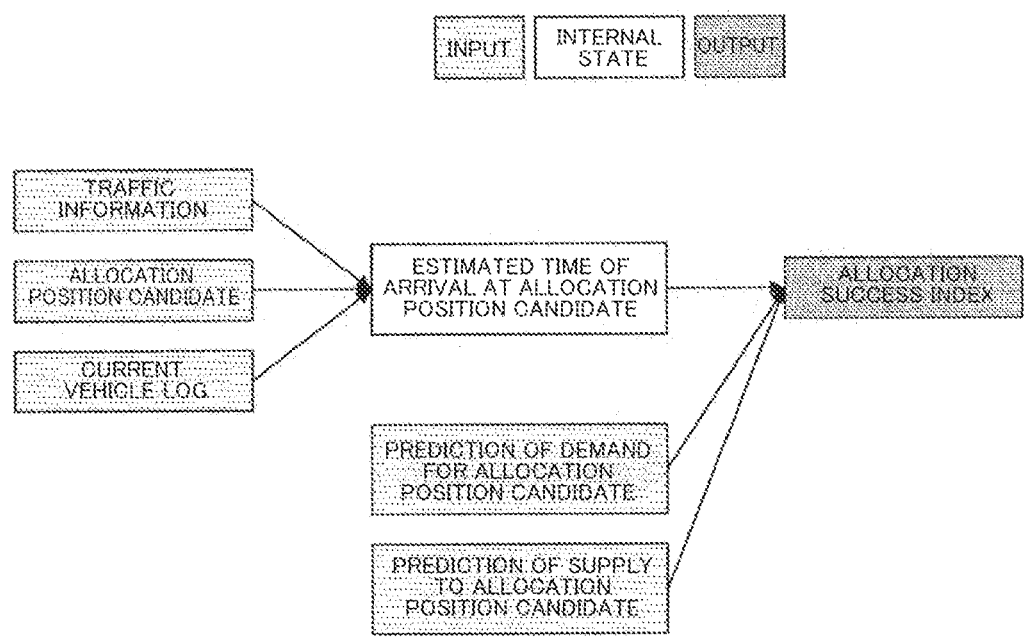
FIG. 10 is a diagram illustrating an example of an allocation success index calculation logic according to the present embodiment.

FIG. 10 is a diagram illustrating an example of an allocation success index calculation logic according to the present embodiment. As illustrated in FIG. 10, traffic information, an allocation position candidate, and a current vehicle log are input and an estimated time of arrival at the allocation position candidate is calculated. In addition, prediction of demand for the allocation position candidate (corresponding to a demand prediction result) and prediction of supply to the allocation position candidate (corresponding to allocation information and an allocation prediction result) are input and an allocation success index is calculated on the basis of such information and the estimated time of arrival at the allocation position candidate. Specifically, the allocation success index calculation unit 141 calculates an allocation success index on the basis of a predicted demand amount for taxis 3 (corresponding to the demand prediction result) and a predicted supply amount for the taxis 3 (corresponding to the allocation information and the allocation prediction result) at the estimated time of arrival at the allocation position candidate. The allocation success index calculation unit 141 calculates a higher allocation success index for excessive demand and calculates a lower allocation success index for excessive supply. An allocation success index and demand-and-supply balance will be described with reference to FIG. 11.

Figure 11:
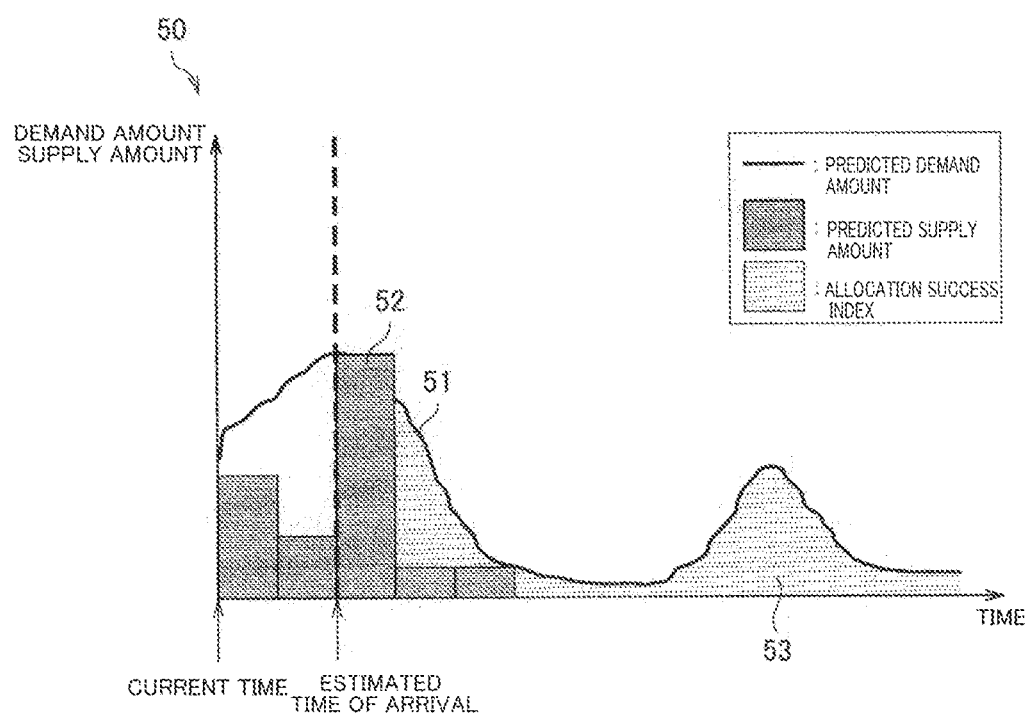
FIG. 11 is a diagram for describing a relationship between an allocation success index and demand-and-supply balance according to the present embodiment.

FIG. 11 is a diagram for describing a relationship between an allocation success index and demand-and-supply balance according to the present embodiment. A graph 50 illustrated in FIG. 11 shows time-series variation in a predicted demand amount and a predicted supply amount in a certain allocation position candidate. The vertical axis of the graph 50 is a demand amount or a supply amount and the horizontal axis is time. The origin of the graph 50 is a current time. The area of a region 53 obtained by subtracting a predicted supply amount 52 from a predicted demand amount 51 (i.e., a value obtained by integrating a value obtained by subtracting the predicted supply amount from the predicted demand amount in the time direction) after an estimated time of arrival at the allocation position candidate corresponds to an allocation success index. The allocation success index increases as the area of the region 53 increases and decreases as the area of the region 53 decreases.

The allocation success index calculation unit 141 calculates an allocation success index whenever a vehicle state (a vehicle log, allocation information, and the like), and demand prediction or supply prediction (corresponding to allocation information and an allocation prediction result) change. Accordingly, freshness of the allocation success index can be maintained.

The allocation success index calculation unit 141 calculates an allocation success index for each taxi 3 and each allocation position candidate and generates allocation success index information. That is, the allocation success index information is generated for each taxi 3 and each allocation position candidate. In addition, the allocation success index calculation unit 141 outputs the allocation success index information to the allocation success index storage unit 142. An example of a format of the allocation success index information is shown in Table 12 below.

TABLE 12

Table 12. Example of format of allocation success index information

| Item name | Supplement |
| --- | --- |
| Vehicle ID | Taxi identification information. May be a wireless number set in a taxi. |
| Driver ID | Driver identification information |
| Current time | |
| Current vehicle position | Information for identifying a current position of a taxi. Cell ID or latitude information and longitude information |
| Allocation position candidate | Information for identifying an allocation position candidate. Cell ID or latitude information and longitude information |
| Estimated time of arrival at allocation position candidate | Estimated time of arrival at an allocation position candidate calculated in consideration of traffic conditions and the like |
| Allocation success index | Probability of success of allocation |

Allocation Success Index Storage Unit 142

The allocation success index storage unit 142 has a function of storing allocation success index information. The allocation success index storage unit 142 may search for and output data in response to a search request. The allocation success index storage unit 142 outputs the stored allocation success index information to the allocation unit 143.

In addition, the allocation success index storage unit 142 may output the stored allocation success index information to a driver terminal 310 corresponding to a vehicle ID and a driver ID of the allocation success index information. For example, the driver terminal 310 may display the map information 21 on which an allocation success index for each cell is overlaid on the allocation information input screen 20, as illustrated in FIG. 5, on the basis of the acquired allocation success index information when the allocation mode is a semi-manual mode.

Allocation Unit 143

The allocation unit 143 has a function of performing allocation. That is, the allocation unit 143 generates an allocation instruction for each taxi 3 under control thereof. The allocation unit 143 performs allocation on the basis of allocation system dependence, an allocation request, a vehicle log, allocation information, and an allocation success index.

Performing allocation using an allocation success index means performing allocation on the basis of a predicted demand amount (corresponding to a demand prediction result) and a predicted supply amount (corresponding to allocation information and an allocation prediction result) for the taxis 3. Here, the predicted supply amount includes allocation information input by drivers who follow the allocation system 1, allocation information input by drivers who do not follow the allocation system 1, and prediction of behaviors of drivers who do not follow the allocation system 1 and do not even input the allocation information. That is, the allocation unit 143 performs allocation on the basis of prediction of behaviors of drivers who follow the allocation system 1, drivers who do not follow the allocation system 1, and drivers who do not follow the allocation system 1 and do not even input the allocation information. In this manner, since allocation can be performed by additionally taking behaviors of drivers who do not follow the allocation system 1 into account, the accuracy of allocation instructions can be improved.

The allocation unit 143 generates, for a taxi 3 having higher allocation system dependence, an allocation instruction for the taxi 3 to move an allocation position candidate having a higher allocation success index. For example, the allocation unit 143 may allocate allocation instructions by which allocation position candidates having high allocation success indices are set as allocation positions in order from a driver having a higher allocation system dependence. Accordingly, an allocation instruction having a higher allocation success index can be allocated to a driver further depending on the allocation system 1. Meanwhile, allocation of an allocation instruction causes change in supply prediction, and thus allocation success indexes change. Accordingly, it is desirable that the allocation success index calculation unit 141 re-calculate allocation success indexes and the allocation unit 143 perform allocation on the basis of a re-calculation result whenever an allocation instruction is allocated.

The allocation unit 143 performs allocation for all taxis 3 under control thereof targeting at a certain time in the future. Accordingly, it is possible to avoid situations in which an allocation indication having a high allocation success index is allocated to a taxi 3 having low allocation system dependence depending on timing. That is, the allocation unit 143 can certainly allocate an allocation instruction having a high allocation success index to a driver having high allocation system dependence by planning future allocation in advance.

The allocation unit 143 determines whether to re-generate an allocation instruction on the basis of change in allocation success indexes. For example, when an allocation position candidate having an allocation success index reduced by a first threshold value or more is present and, around this allocation position candidate, an allocation position candidate having an allocation success index equal to or greater than a second threshold value is present, the allocation unit 143 may re-perform allocation and re-generate allocation instructions. Accordingly, it is possible to re-allocate an allocation instruction having a high allocation success index to a taxi 3 having high allocation system dependence.

The allocation unit 143 generates allocation instructions on the basis of allocation results and transmits the allocation instructions to the driver terminals 310. The allocation unit 143 generates allocation instructions with respect to taxis 3 in the full-auto allocation mode or the semi-auto allocation mode. An example of a format of an allocation instruction is shown in Table 13 below. Meanwhile, a format of allocation instructions with respect to taxis 3 in the full-auto allocation mode may be the same as that of allocation instructions with respect to taxis 3 in the semi-auto allocation mode.

TABLE 13

Table 13. Example of format of allocation instruction

| Item name | Supplement |
|---|---|
| Allocation instruction ID | Allocation instruction identification information |
| Vehicle ID | Taxi identification information. May be a wireless number set in a taxi. |
| Driver ID | Driver identification information |
| Allocation time | Time of arrival at an allocation position |
| Allocation position | Information for identifying an allocation position. Cell ID or latitude information and longitude information |
| Number of persons scheduled to be boarded | The number of customers scheduled to be boarded |
| Destination | Information for identifying a destination. Cell ID or latitude information and longitude information |
| Desired time of arrival at destination | Customer desire for time of arrival at a destination |
| Presence or absence of large baggage | Whether a trunk is used |
| Desire for highway | Highway wired/non-highway road first |
| Route to allocation position | Recommended route |
| Allocation target user ID | Identification information of a boarded customer |
| Estimated time of arrival at destination | Estimation of time of arrival at a destination |
| Conditions of road to destination | Traffic information on a road to a destination |
| Estimated fare to destination | Estimation of a fare to be charged to arrive at a destination |

The allocation unit 143 generates an allocation response on the basis of allocation results and transmits the allocation response to a customer terminal 200. An example of a format of an allocation response is shown in Table 14 below.

TABLE 14

Table 14. Example of format of allocation response

| Item name | Supplement |
|---|---|
| Scheduled allocation time | |
| Scheduled allocation position | A place where a vehicle can board a customer based on a current position of the customer |
| Driver information | Driver name, etc. |
| Estimated time of arrival at destination | Estimation of time of arrival at a destination |
| Conditions of road to destination | Traffic information on a road to a destination |
| Estimated fare to destination | Estimation of a fare to be charged to arrive at a destination |

4. PROCESSING FLOW

Hereinafter, an example of a flow of processing executed in the allocation control device 100 will be described with reference to FIG. 12 and FIG. 13.

Figure 12:
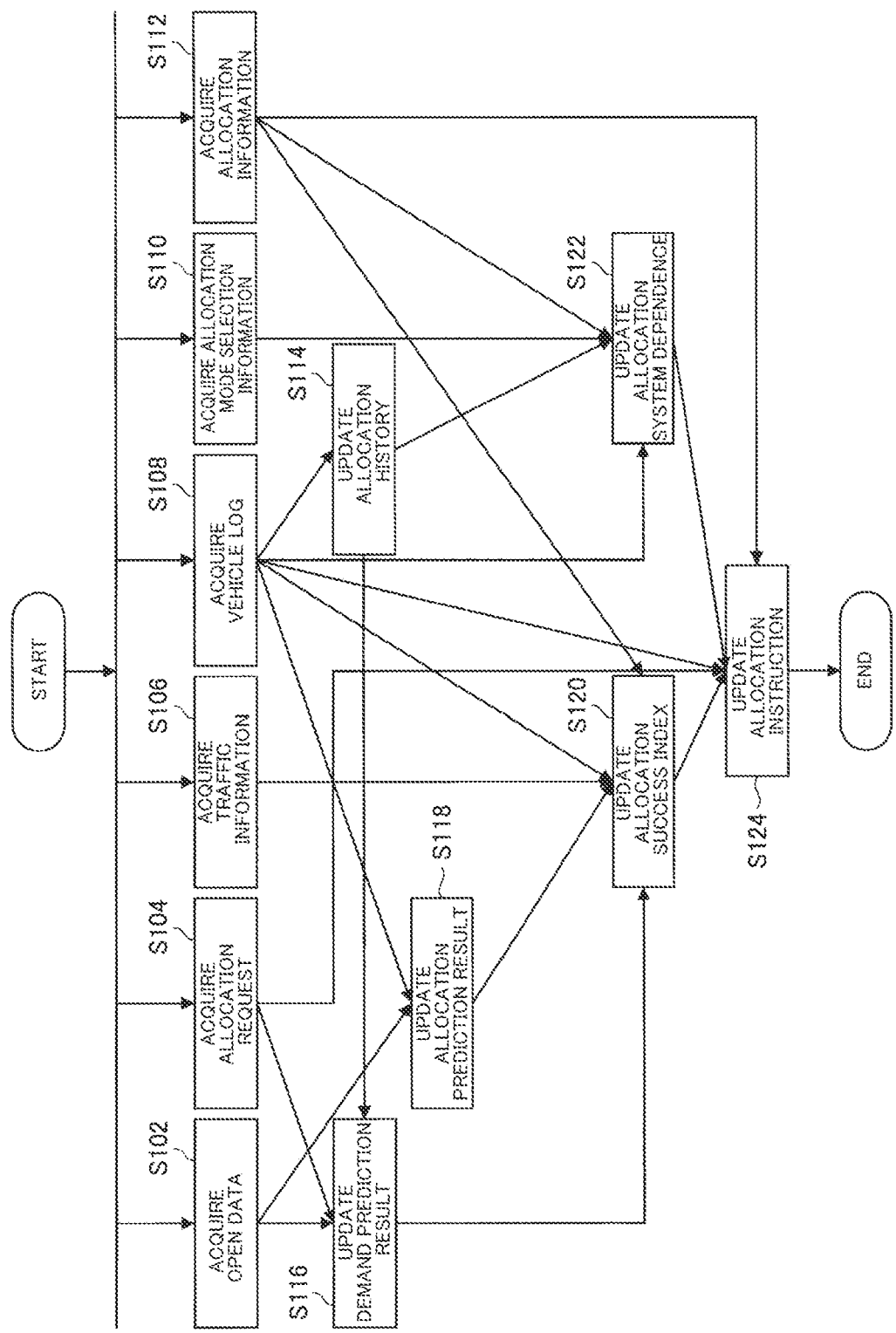
FIG. 12 is a flowchart illustrating an example of a flow of allocation processing executed in the allocation control device according to the present embodiment.

FIG. 12 is a flowchart illustrating an example of a flow of allocation processing executed in the allocation control device 100 according to the present embodiment. As illustrated in FIG. 12, first, processes with respect to steps S102 to S112 are executed in parallel.

In step S102, the open data storage unit 101 acquires open data and updates stored information. The open data storage unit 101 outputs the open data to components in a subsequent stage (i.e., the demand prediction unit 131 and the allocation prediction unit 133).

In step S104, the allocation request acquisition unit 102 and the allocation request storage unit 103 acquire an allocation request and update stored information. The allocation request acquisition unit 102 and the allocation request storage unit 103 output the allocation request to components in a subsequent stage (e.g., the demand prediction unit 131 and the allocation unit 143).

In step S106, the traffic information storage unit 104 acquires traffic information and updates stored information. The traffic information storage unit 104 outputs the traffic information to a component in a subsequent stage (e.g., the allocation success index calculation unit 141).

In step S108, the vehicle log acquisition unit 111 and the vehicle log storage unit 112 acquire a vehicle log and updates stored information. The vehicle log acquisition unit 111 and the vehicle log storage unit 112 output the vehicle log to components in a subsequent stage (e.g., the allocation history extraction unit 113, the allocation prediction unit 133, the allocation system dependence calculation unit 135, the allocation success index calculation unit 141, and the allocation unit 143).

In step S110, the allocation mode selection information acquisition unit 121 acquires allocation mode selection information. The allocation mode selection information acquisition unit 121 outputs the allocation mode selection information to a component in a subsequent stage (i.e., the allocation system dependence calculation unit 135).

In step S112, the allocation information acquisition unit 122 and the allocation information storage unit 123 acquire allocation information and update stored information. The allocation information acquisition unit 122 and the allocation information storage unit 123 output the updated allocation information to components in a subsequent stage (i.e., the allocation system dependence calculation unit 135, the allocation success index calculation unit 141, and the allocation unit 143).

Next, components that have received input of information from components in previous stages update information in steps S114 to S124.

In step S114, the allocation history extraction unit 113 re-extracts an allocation history when the vehicle log is input and the allocation history storage unit 114 updates the allocation history. The allocation history storage unit 114 outputs the updated allocation history to components in a subsequent stage (i.e., the demand prediction unit 131 and the allocation system dependence calculation unit 135).

In step S116, the demand prediction unit 131 re-performs demand prediction when at least any of open data and a new allocation history is input, and the demand prediction result storage unit 132 updates demand prediction results. The demand prediction result storage unit 132 outputs the updated demand prediction results to a component in a subsequent stage (i.e., the allocation success index calculation unit 141).

In step S118, the allocation prediction unit 133 re-performs allocation prediction when at least any of open data and a vehicle log is input, and the allocation prediction result storage unit 134 updates the allocation prediction results. The allocation prediction result storage unit 134 outputs the updated allocation prediction results to a component in a subsequent stage (i.e., the allocation success index calculation unit 141).

In step S120, the allocation success index calculation unit 141 re-calculates allocation success indexes when at least any of a demand prediction result, an allocation prediction result, allocation information, traffic information and an allocation history is input, and the allocation success index storage unit 142 updates allocation success indexes. The allocation success index storage unit 142 outputs the updated allocation success indexes to components in a subsequent stage (i.e., the allocation unit 143 and the driver terminal 310).

In step S122, the allocation system dependence calculation unit 135 re-calculates allocation system dependence when at least any of an allocation history, a vehicle log, allocation information, and allocation mode selection information is input, and the allocation system dependence storage unit 136 updates allocation system dependence. The allocation system dependence storage unit 136 outputs the updated allocation system dependence to a component in a subsequent stage (i.e., the allocation unit 143).

In step S124, the allocation unit 143 re-generates an allocation instruction and overwrites (i.e., updates) a previously generated allocation instruction when at least any of allocation system dependence, an allocation request, a vehicle log, and allocation information is input.

An example of a flow of allocation processing has been described above. Subsequently, processing with respect to steps S114 to S124 illustrated in FIG. 12 will be described in detail with reference to FIG. 13.

Figure 13:
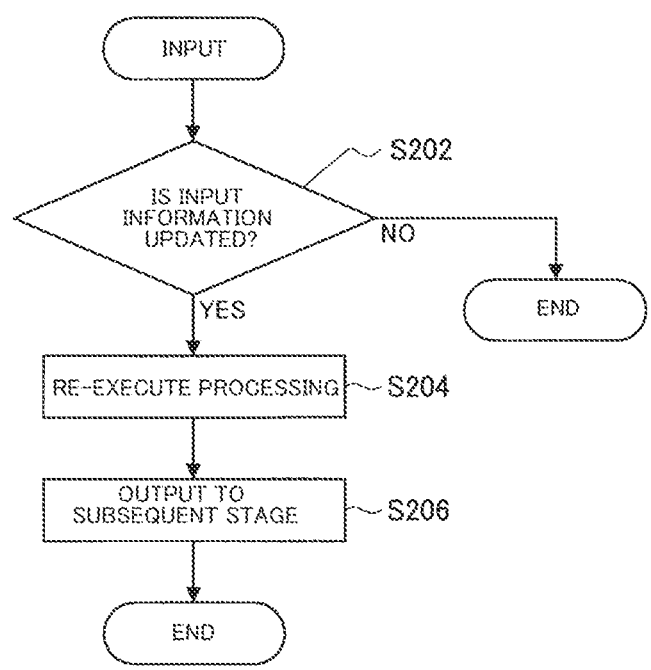
FIG. 13 is a flowchart illustrating an example of a flow of information update processing executed in the allocation control device according to the present embodiment.

FIG. 13 is a flowchart illustrating an example of a flow of information update processing executed in the allocation control device 100 according to the present embodiment. As illustrated in FIG. 13, when information is input from a component in a previous stage, a target component determines whether the input information has been updated (step S202). When it is determined that the input information has not been updated (NO in step S202), processing ends. On the other hand, when it is determined that the input information has been updated (YES in step S202), the target component re-executes processing (step S204). For example, the target component is the allocation history extraction unit 113 in step S114, and the allocation history extraction unit 113 re-extracts an allocation history. Then, the target component outputs a processing result to a component in a subsequent stage (step S206), and processing ends.

5. HARDWARE CONFIGURATION EXAMPLE

Figure 14:
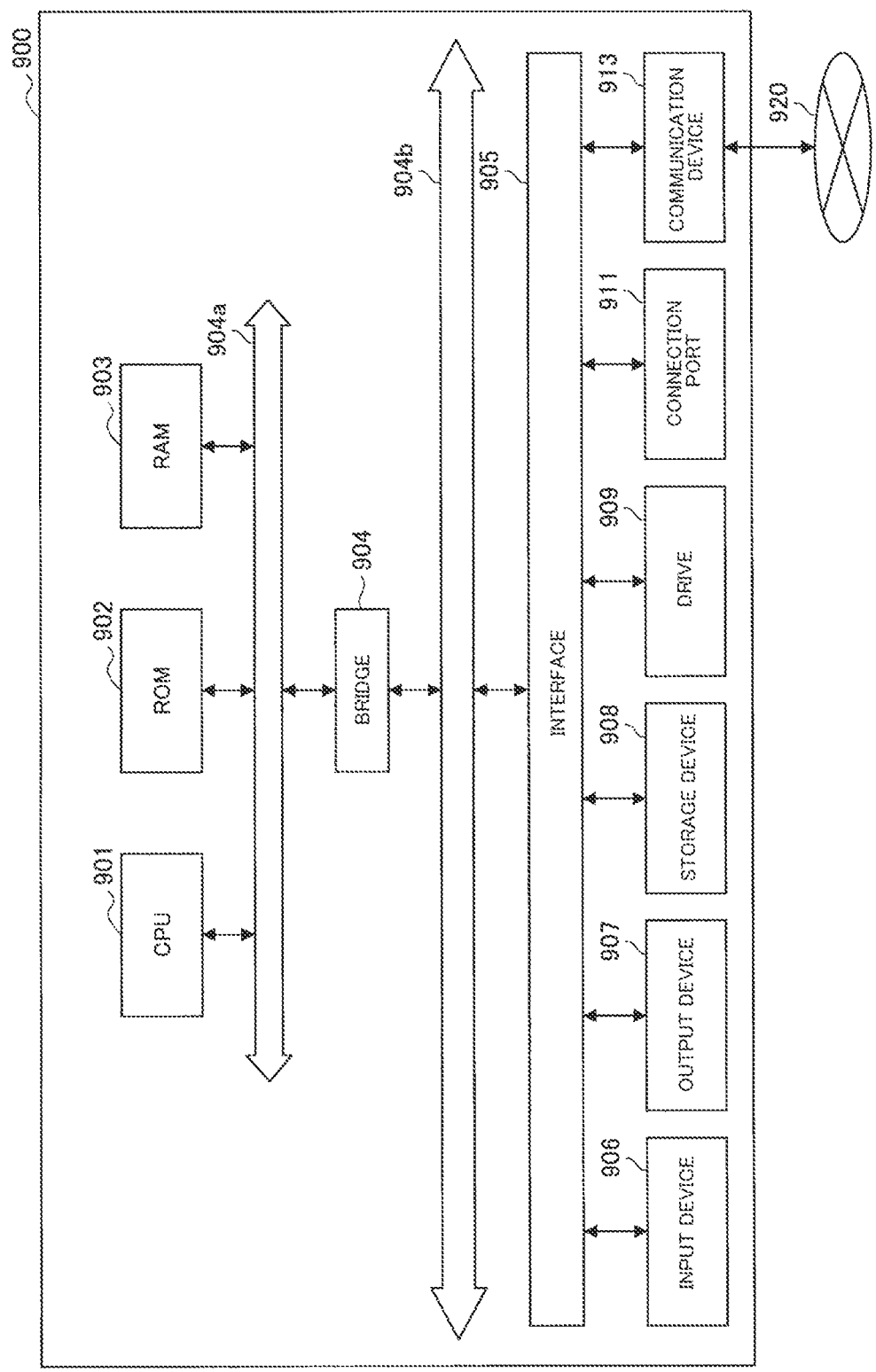
FIG. 14 is a block diagram illustrating an example of a hardware configuration of an information processing apparatus according to the present embodiment.

Finally, a hardware configuration of an information processing apparatus according to the present embodiment will be described with reference to FIG. 14. FIG. 14 is a block diagram illustrating an example of a hardware configuration of the information processing apparatus according to the present embodiment. Meanwhile, the information processing apparatus 900 illustrated in FIG. 14 may realize, for example, the allocation control device 100, the customer terminal 200, the vehicle log generation device 300, or the driver terminal 310 illustrated in FIG. 2. Information processing performed by the allocation control device 100, the customer terminal 200, the vehicle log generation device 300, or the driver terminal 310 according to the present embodiment is realized by software and hardware which will be described below in cooperation.

As illustrated in FIG. 14, the information processing apparatus 900 includes a central processing unit (CPU) 901, a read only memory (ROM) 902, a random access memory (RAM) 903, and a host bus 904a. In addition, the information processing apparatus 900 includes a bridge 904, an external bus 904b, an interface 905, an input device 906, an output device 907, a storage device 908, a drive 909, a connection port 911, and a communication device 913. The information processing apparatus 900 may include a processing circuit such as an electronic circuit, a DSP, or an ASIC instead of or in addition to the CPU 901.

The CPU 901 serves as an arithmetic operation processing device and a control device and controls overall operations in the information processing apparatus 900 according to various programs. In addition, the CPU 901 may be a microprocessor. The ROM 902 stores programs, arithmetic operation parameters, and the like used by the CPU 901. The RAM 903 temporarily stores programs used in execution of the CPU 901, parameters appropriately changing in execution of programs, and the like. For example, the CPU 901 may constitute the allocation request acquisition unit 102, the vehicle log acquisition unit 111, the allocation history extraction unit 113, the allocation mode selection information acquisition unit 121, the allocation information acquisition unit 122, the demand prediction unit 131, the allocation prediction unit 133, the allocation success index calculation unit 141, and the allocation unit 143 illustrated in FIG. 2.

The CPU 901, the ROM 902, and the RAM 903 are connected through the host bus 904a including a CPU bus and the like. The host bus 904a is connected to the external bus 904b such as a peripheral component interconnect/interface (PCI) bus through the bridge 904. Meanwhile, the host bus 904a, the bridge 904 and the external bus 904b need not be necessarily separately configured and these functions may be mounted in one bus.

The input device 906 may be realized, for example, as a device through which a user inputs information, such as a mouse, a keyboard, a touch panel, a button, a microphone, a switch, and a lever. In addition, the input device 906 may be, for example, a remote control device using infrared rays or other radio waves or an external connection apparatus such as a cellular phone, a PDA, or the like that supports operation of the information processing apparatus 900. Further, the input device 906 may include, for example, an input control circuit or the like which generates an input signal on the basis of information input by the user using the aforementioned input means and outputs the input signal to the CPU 901. A user of the information processing apparatus 900 can input various types of data or instruct processing operation with respect to the information processing apparatus 900 by operating the input device 906. For example, the input device 906 may be included in the customer terminal 200 illustrated in FIG. 2 and receive input by the customer 2. The input device 906 may be included in the driver terminal 310 illustrated in FIG. 2 and receive input by the driver of the taxi 3, for example.

The output device 907 is configured as a device capable of visually or acoustically notifying a user of acquired information. As such a device, there are display devices such as a CRT display device, a liquid crystal display device, a plasma display device, an EL display device, a laser projector, an LED projector, and a lamp, audio output devices such as a speaker and a headphone, a printer device, and the like. The output device 907 may output, for example, results obtained by various types of processing performed by the information processing apparatus 900. Specifically, a display device visually displays results obtained by various types of processing performed by the information processing apparatus 900 in various forms such as text, images, tables, and graphs. On the other hand, an audio output device converts an audio signal composed of reproduced voice data, audio data, and the like into an analog signal and acoustically outputs the analog signal. For example, the output device 907 may be included in the customer terminal 200 illustrated in FIG. 2 and output information to the customer 2. For example, the output device 907 may be included in the driver terminal 310 illustrated in FIG. 2 and output information to the driver of the taxi 3.

The storage device 908 is a device for data storage, which is configured as an example of a storage unit of the information processing apparatus 900. The storage device 908 may be realized as, for example, a magnetic storage device such as an HDD, a semiconductor storage device, an optical storage device, a magneto-optical storage device, or the like. The storage device 908 may include a storage medium, a recording device that records data in the storage medium, a read device that reads data from the storage medium, a deleting device that deletes data recorded in the storage medium, and the like. This storage device 908 stores programs and various types of data executed by the CPU 901, various types of data acquired from the outside, and the like. For example, the storage device 908 may constitute the open data storage unit 101, the allocation request storage unit 103, the traffic information storage unit 104, the vehicle log storage unit 112, the allocation history storage unit 114, the demand prediction result storage unit 132, the allocation prediction result storage unit 134, and the allocation success index storage unit 142 illustrated in FIG. 2, for example.

The drive 909 is a reader/writer for recording media and is embedded in the information processing apparatus 900 or attached to the outside thereof. The drive 909 reads information recorded in a removable storage medium inserted therein, such as a magnetic disk, an optical disc, a magneto-optical disc, or a semiconductor memory, and outputs the read information to the RAM 903. In addition, the drive 909 can write information in the removable storage medium.

The connection port 911 is an interface connected to an external apparatus and is a connector to an external apparatus through which data can be transmitted through a universal serial bus (USB), and the like.

The communication device 913 may be a communication interface configured as a communication device or the like for connecting to a network 920, for example. The communication device 913 may be, for example, a communication card or the like for a wired or wireless local area network (LAN), long term evolution (LTE), Bluetooth (registered trademark), or a wireless USB (WUSB). In addition, the communication device 913 may be a router for optical communication, a router for asymmetric digital subscriber line (ADSL), a modem for various communications, or the like. This communication device 913 may transmit/receive signals and the like, for example, according to a predetermined protocol such as TCP/IP between, for example, the Internet and other communication apparatuses. In the present embodiment, the communication device 913 is included in each of the allocation control device 100, the customer terminal 200, the vehicle log generation device 300, and the driver terminal 310 and transmits/receives information between the devices.

Meanwhile, the network 920 is a wired or wireless transmission path for information transmitted from devices connected to the network 920. For example, the network 920 may include public networks such as the Internet, a telephone networks, and satellite communication networks, various local area networks (LAN), and wide area networks (WAN) including the Ethernet (registered trademark), and the like. In addition, the network 920 may include a private line network such as the internet protocol-virtual private network (IP-VPN).

An example of the hardware configuration capable of realizing the functions of the information processing apparatus 900 according to the present embodiment has been illustrated above. Each of the aforementioned components may be configured using a universal member or realized as hardware specialized for the function of each component. Accordingly, a hardware configuration to be used may be appropriately changed in response to a technical level when the present embodiment is embodied.

Meanwhile, a computer program for realizing each function of the above-described information processing apparatus 900 according to the present embodiment can be manufactured and mounted in a PC or the like. In addition, a computer-readable recording medium in which the computer program is stored may also be provided. The recording medium may be, for example, a magnetic disk, an optical disk, a magneto-optical disk, a flash memory, or the like. Further, the aforementioned computer program may be distributed, for example, through a network without using a recording medium.

6. CONCLUSION

An embodiment of the present disclosure has been described above in detail with reference to FIG. 1 to FIG. 14. As described above, the allocation control device 100 according to the present embodiment acquires information about transport objects for each space and acquires information indicating a tendency of whether moving objects move in accordance with movement instructions. In addition, the allocation control device 100 generates movement instructions for moving objects that will carry transport objects on the basis of the acquired information. The allocation control device 100 can generate movement instructions in consideration of the influence of moving objects that do not follow movement instructions on moving objects that follow movement instructions by referring to the information indicating a tendency of whether moving objects move in accordance with movement instructions. Accordingly, stealing requests between a moving object that follows movement instructions and a moving object that does not follow movement instructions can be reduced, and thus transportation of transport objects using moving objects can be performed more efficiently.

Meanwhile, the present technology is assumed to be applied in a period of transition to an autonomous driving era. In the period of transition to the autonomous driving era, it is conceived that taxis 3 that follow the allocation system 1 (including automatically driven taxis 3) and taxis 3 that do not follow the allocation system 1 are present. In such a case, it is possible to increase a proportion of taxis 3 that follow the allocation system 1 by applying the present technology to efficiently plan overall allocation.

Although suitable embodiments of the present disclosure have been described above in detail with reference to the attached drawings, the technical scope of the present disclosure is not limited to such examples. It will be apparent to those skilled in the art that various modification examples and amendment examples are possible without departing from the scope of the technical spirit described in claims, and it will be understood that these examples also belong to the technical scope of the present disclosure.

Meanwhile, a series of processes performed by each device described in this specification may be realized using any of software, hardware, and a combination of software and hardware. Programs constituting software are stored in advance in recording media (non-transitory media) provided insider or outside each device. In addition, each program may be read to a RAM and executed by a processor such as a CPU during execution by a computer, for example. The aforementioned recording media may be, for example, a magnetic disk, an optical disc, a magneto-optical disc, a flash memory, and the like. Further, the aforementioned computer programs may be distributed through a network without using recording media, for example.

Furthermore, processing described using flowcharts in this specification need not be necessarily executed in the illustrated orders. Several processing steps may be executed in parallel. Furthermore, additional processing steps may be employed or some processing steps may be omitted.

Furthermore, the effects described in this specification are explanatory or illustrative and are not limitative. That is, the technology according to the present disclosure may obtain other effects apparent to those skilled in the art from description of this specification in addition to or instead of the aforementioned effects.

Meanwhile, the following configurations also belong to the technical scope of the present disclosure.

(1)

An information processing apparatus that generates a movement instruction for a moving object that carries a transport object, including: a first acquisition unit configured to acquire information about the transport object for each space; a second acquisition unit configured to acquire information representing a tendency of whether the moving object moves in accordance with the movement instruction; and a generation unit configured to generate the movement instruction for the moving object on the basis of the information about the transport object and the information representing the tendency.

(2)

The information processing apparatus according to (1), wherein the information about the transport object includes information indicating a boarding success probability of the transport object for each space.

(3)

The information processing apparatus according to (2), wherein the generation unit generates the movement instruction for instructing the moving object to move to a space in which the boarding success probability of the transport object is higher when the moving object more strongly tends to move in accordance with the movement instruction.

(4)

The information processing apparatus according to (2) or (3), wherein the information indicating the boarding success probability of the transport object is calculated on the basis of a predicted demand amount for the moving object and a predicted supply amount for the moving object for each space.

(5)

The information processing apparatus according to any one of (1) to (4), wherein the generation unit determines whether to re-generate the movement instruction on the basis of a change in the boarding success probability.

(6)

The information processing apparatus according to any one of (1) to (5), further comprising a third acquisition unit configured to acquire information representing a movement schedule of the moving object from the moving object, wherein the generation unit generates the movement instruction for the moving object on the basis of the information representing the movement schedule of the moving object.

(7)

The information processing apparatus according to (6), wherein, when the third acquisition unit has failed to acquire the information representing the movement schedule of the moving object from the moving object, the third acquisition unit predicts a movement schedule of the moving object, and the generation unit generates the movement instruction for the moving object on the basis of a result of prediction of the movement schedule of the moving object.

(8)

The information processing apparatus according to (6) or (7), wherein, when an operation mode of the moving object is a first mode, a terminal device associated with the moving object displays a screen including map information to which information representing a space of a movement destination indicated through the movement instruction is mapped, and the third acquisition unit acquires information indicating whether the moving object moves in accordance with the movement instruction.

(9)

The information processing apparatus according to any one of (6) to (8), wherein, when the operation mode of the moving object is a second mode, the terminal device associated with the moving object displays a screen including map information to which information indicating the boarding success probability of the transport object for each space and information representing a space to which movement is instructed through the movement instruction are mapped, and the third acquisition unit acquires information indicating a space of a movement destination input through the screen.

(10)

The information processing apparatus according to any one of (6) to (9), wherein, when the operation mode of the moving object is a third mode, the terminal device associated with the moving object displays a screen including map information, and the third acquisition unit acquires information indicating a space of a movement destination input through the screen.

(11)

The information processing apparatus according to any one of (8) to (10), wherein the information representing the tendency is set in response to the operation mode.

(12)

The information processing apparatus according to (8) or any one of (9) to (11) that cite (8), wherein the information representing the tendency is set in response to a duration of the first mode.

(13)

The information processing apparatus according to any one of (1) to (12), wherein the information representing the tendency is set in response to a tendency of whether the moving object moves in accordance with the movement instruction.

(14)

The information processing apparatus according to any one of (1) to (13), wherein the information representing the tendency is set in response to whether a space of a movement destination changes after it is determined that the moving object follows the movement instruction.

(15)

The information processing apparatus according to any one of (1) to (14), wherein the information representing the tendency is set in response to whether the space of the movement destination of the moving object is presented to the information processing apparatus.

(16)

The information processing apparatus according to any one of (1) to (15), wherein the second acquisition unit causes the terminal device associated with the moving object to display information representing a behavior that triggers a change of the information representing the tendency.

(17)

An information processing method for generating a movement instruction for a moving object that carries a transport object, the information processing apparatus, executed by a processor, including: acquiring information about the transport object for each space; acquiring information representing a tendency of whether the moving object moves in accordance with the movement instruction; and generating the movement instruction for the moving object on the basis of the information about the transport object and the information representing the tendency.

(18)

A program for causing a computer that controls an information processing apparatus that generates a movement instruction for a moving object that carries a transport object to serve as: a first acquisition unit configured to acquire information about the transport object for each space; a second acquisition unit configured to acquire information representing a tendency of whether the moving object moves in accordance with the movement instruction; and a generation unit configured to generate the movement instruction for the moving object on the basis of the information about the transport object and the information representing the tendency.

REFERENCE SIGNS LIST

1 Allocation system
2 Transport object, customer
3 Mobile object, taxi
100 Allocation control device
101 Open data storage unit
102 Allocation request acquisition unit
103 Allocation request storage unit
104 Traffic information storage unit
111 Vehicle log acquisition unit
112 Vehicle log storage unit
113 Allocation history extraction unit
114 Allocation history storage unit
121 Allocation mode selection information acquisition unit
122 Allocation information acquisition unit
123 Allocation information storage unit
131 Demand prediction unit
132 Demand prediction result storage unit
133 Allocation prediction unit
134 Allocation prediction result storage unit
135 Allocation system dependence calculation unit
135A Basic point calculation unit based on allocation mode
135B Driver information storage unit
135C Additional point calculation unit according to continuous use of full-auto allocation mode
135D Additional point calculation unit based on operation according to instruction of allocation system
135E Subtracted point calculation unit according to change in determined allocation information
135F Additional point calculation unit according to input of allocation information
135G Total point calculation unit
136 Allocation system dependence storage unit
141 Allocation success index calculation unit
142 Allocation success index storage unit
143 Allocation unit
200 Customer terminal
300 Vehicle log generation device
310 Driver terminal

The invention claimed is:

1. An information processing apparatus, comprising:
circuitry configured to:
acquire first information about a transport object for each space;
acquire second information representing a tendency of a moving object to move based on a movement instruction;
acquire, from the moving object, third information that represents a movement schedule of the moving object; and
generate, based on each of the first information, the second information, and the third information, the movement instruction for the moving object, wherein the movement instruction is an instruction for the moving object to load and transport the transport object.

2. The information processing apparatus according to claim 1, wherein the first information about the transport object includes information indicating a boarding success probability of the transport object for each space.

3. The information processing apparatus according to claim 2, wherein the circuitry is further configured to
generate, in a case where the moving object tends to move based on the movement instruction, the movement instruction for instruction of the moving object to move to a space in which the boarding success probability of the transport object is highest.

4. The information processing apparatus according to claim 2, wherein the first information indicating the boarding success probability of the transport object is based on a predicted demand amount for the moving object and a predicted supply amount for the moving object for each space.

5. The information processing apparatus according to claim 2, wherein the circuitry is further configured to determine whether to re-generate the movement instruction, based on a change in the boarding success probability.

6. The information processing apparatus according to claim 1, wherein, in a case where the acquisition of the third information from the moving object fails, the circuitry is further configured to:
predict the movement schedule of the moving object, and
generate the movement instruction for the moving object based on a result of the prediction of the movement schedule of the moving object.

7. The information processing apparatus according to claim 1, wherein,
in a case where an operation mode of the moving object is a first mode, a terminal device associated with the moving object displays a screen including map information,
information representing a space of a movement destination indicated through the movement instruction is mapped to the map information, and
the circuitry is further configured to acquire fourth information indicating movement of the moving object based on the movement instruction.

8. The information processing apparatus according to claim 2, wherein,
in a case where an operation mode of the moving object is a second mode, a terminal device associated with the moving object displays a screen including map information,
each of the first information indicating the boarding success probability of the transport object for each space and information representing a space to which movement is instructed through the movement instruction are mapped to the map information, and
the circuitry is further configured to acquire fourth information indicating a space of a movement destination that is input through the screen.

9. The information processing apparatus according to claim 1, wherein,
in a case where a operation mode of the moving object is a third mode, a terminal device associated with the moving object displays a screen including map information, and
the circuitry is further configured to acquire fourth information indicating a space of a movement destination that is input through the screen.

10. The information processing apparatus according to claim 7, wherein the second information representing the tendency is set in response to the operation mode.

11. The information processing apparatus according to claim 7, wherein the second information representing the tendency is set in response to a duration of use of the first mode.

12. The information processing apparatus according to claim 1, wherein the second information representing the tendency is set in response to whether the moving object moves based on the movement instruction.

13. The information processing apparatus according to claim 1, wherein the second information representing the tendency is set in response to whether a space of a movement destination changes after the moving object follows the movement instruction.

14. The information processing apparatus according to claim 1, wherein the second information representing the tendency is set in response to whether a space of a movement destination of the moving object is presented to the information processing apparatus.

15. The information processing apparatus according to claim 1, wherein the circuitry is further configured to cause a terminal device associated with the moving object to display information representing a behavior that triggers a change of the second information representing the tendency.

16. An information processing method, comprising:
acquiring first information about a transport object for each space;
acquiring second information representing a tendency of a moving object to move based on a movement instruction;
acquiring, from the moving object, third information that represents a movement schedule of the moving object; and
generating, based on each of the first information, the second information, and the third information, the movement instruction for the moving object, wherein the movement instruction is an instruction for the moving object to load and transport the transport object.

17. A non-transitory computer-readable medium having stored thereon, computer-executable instructions which, when executed by a computer, cause the computer to execute operations, the operations comprising:
acquiring first information about a transport object for each space;
acquiring second information representing a tendency of a moving object to move based on a movement instruction;
acquiring, from the moving object, third information that represents a movement schedule of the moving object; and generating, based on each of the first information, the second information, and the third information, the movement instruction for the moving object, wherein the movement instruction is an instruction for the moving object to load and transport the transport object.

18. An information processing apparatus, comprising:

circuitry configured to:
- acquire first information about a transport object for each space;
- acquire second information representing a tendency of a moving object to move based on a movement instruction, wherein the second information is set in response to whether a space of a movement destination of the moving object is presented to the information processing apparatus; and
- generate, based on each of the first information and the second information, the movement instruction for the moving object, wherein
   the movement instruction is an instruction for the moving object to load and transport the transport object.

* * * * *